(12) United States Patent
Leoni et al.

(10) Patent No.: US 10,558,275 B2
(45) Date of Patent: Feb. 11, 2020

(54) E-PAPER DISPLAY WRITER

(71) Applicant: Hewlett-Packard Development Company, L.P., Fort Collins, CO (US)

(72) Inventors: Napoleon J Leoni, Palo Alto, CA (US); Omer Gila, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 148 days.

(21) Appl. No.: 15/114,413

(22) PCT Filed: Jan. 31, 2014

(86) PCT No.: PCT/US2014/014315
§ 371 (c)(1),
(2) Date: Jul. 27, 2016

(87) PCT Pub. No.: WO2015/116216
PCT Pub. Date: Aug. 6, 2015

(65) Prior Publication Data
US 2017/0045954 A1 Feb. 16, 2017

(51) Int. Cl.
*G06F 3/033* (2013.01)
*G06F 3/03* (2006.01)
*G02F 1/167* (2019.01)
*G06Q 20/34* (2012.01)
*G07F 7/08* (2006.01)
(Continued)

(52) U.S. Cl.
CPC .............. *G06F 3/03* (2013.01); *G02F 1/167* (2013.01); *G06Q 20/341* (2013.01); *G06Q 20/3415* (2013.01); *G07F 7/0846* (2013.01);

*G09G 3/344* (2013.01); *G02F 1/1676* (2019.01); *G09G 2354/00* (2013.01)

(58) Field of Classification Search
CPC .... G06F 3/03; G02F 1/167; G02F 2001/1676; G06Q 20/341; G06Q 20/3415; G07F 7/0846; G09G 3/344; G09G 2354/00
See application file for complete search history.

(56) References Cited

U.S. PATENT DOCUMENTS 5,866,284 A   2/1999   Vincent
6,291,925 B1 * 9/2001   Jacobson ............... G09G 3/344
                                                              310/318

(Continued)

FOREIGN PATENT DOCUMENTS

CN    101059950    10/2007
CN    101171595    4/2008
(Continued)

OTHER PUBLICATIONS

Ubiquitous display Liang-Han Lin ; Dept. of Energy & Refrigerating Air-Conditioning Eng., Nat. Taipei Univ. of Technol.. Taipei. Taiwan : Da-Sheng Lee.

*Primary Examiner* — Olga V Merkoulova
(74) *Attorney, Agent, or Firm* — Dicke Billig & Czaja PLLC

(57) ABSTRACT

A writing device to write on a media, which includes a passive electronic paper display and a storage medium. The writing device comprises a first component to at least read the storage medium and a second component to at least write to the electronic paper display during relative movement between the second component and the media.

20 Claims, 11 Drawing Sheets

(51) Int. Cl.
   *G09G 3/34* (2006.01)
   *G02F 1/1676* (2019.01)

(56) References Cited

U.S. PATENT DOCUMENTS

| | | | |
|---|---|---|---|
| 6,333,754 B1 | 12/2001 | Oba et al. | |
| 6,473,072 B1* | 10/2002 | Comiskey | B41J 3/4076 345/107 |
| 6,515,790 B2 | 2/2003 | Miyamoto et al. | |
| 6,753,999 B2 | 6/2004 | Zehner et al. | |
| 6,831,662 B1* | 12/2004 | Lum | G09G 3/3622 345/100 |
| 6,982,734 B2* | 1/2006 | Pan | B41J 2/3855 347/120 |
| 7,140,550 B2 | 11/2006 | Ramachandran | |
| 7,580,845 B2 | 8/2009 | Burman et al. | |
| 8,144,388 B2 | 3/2012 | Ogawa | |
| 8,514,256 B2 | 8/2013 | Ogawa et al. | |
| 8,594,730 B2 | 11/2013 | Bona et al. | |
| 2003/0067427 A1 | 4/2003 | Comiskey et al. | |
| 2004/0212600 A1* | 10/2004 | Kodama | G03G 15/326 345/173 |
| 2005/0134550 A1* | 6/2005 | Schmitz | G09F 9/372 345/107 |
| 2005/0247797 A1* | 11/2005 | Ramachandran | G06K 19/08 235/492 |
| 2006/0017659 A1* | 1/2006 | Ogawa | B41J 3/4076 345/30 |
| 2007/0045399 A1 | 3/2007 | Martin | |
| 2007/0143621 A1 | 6/2007 | Jung et al. | |
| 2007/0176850 A1* | 8/2007 | Hirose | G06F 3/147 345/30 |
| 2007/0242033 A1* | 10/2007 | Cradick | G06F 3/0412 345/156 |
| 2007/0283248 A1* | 12/2007 | Yoshida | G09F 9/372 715/273 |
| 2011/0298760 A1* | 12/2011 | Gila | G02F 1/167 345/179 |
| 2011/0320925 A1 | 12/2011 | Piersol et al. | |
| 2012/0206341 A1* | 8/2012 | Gila | B41J 3/4076 345/156 |
| 2012/0249711 A1 | 10/2012 | Tamoto | |
| 2012/0320001 A1* | 12/2012 | Gila | G02F 1/167 345/204 |
| 2013/0003162 A1* | 1/2013 | Leoni | G02F 1/167 359/296 |
| 2013/0235446 A1* | 9/2013 | Leoni | G02F 1/167 359/296 |
| 2014/0210805 A1 | 7/2014 | Birecki et al. | |
| 2014/0239068 A1* | 8/2014 | Park | G06Q 20/341 235/449 |
| 2014/0253426 A1 | 9/2014 | Leoni et al. | |

FOREIGN PATENT DOCUMENTS

| | | |
|---|---|---|
| CN | 101268501 | 9/2008 |
| KR | 20130092934 | 8/2013 |
| WO | WO-2013058757 | 4/2013 |

\* cited by examiner

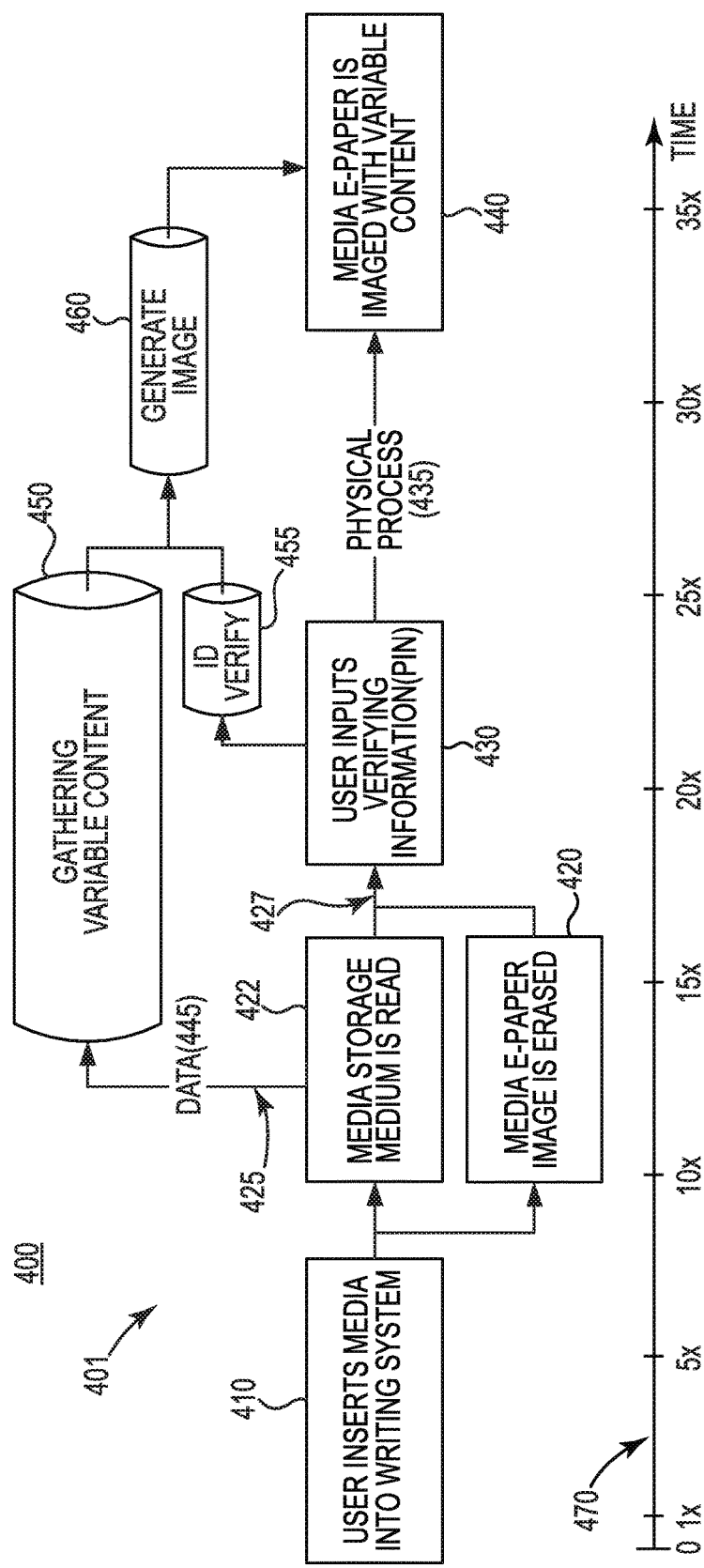
Fig. 12
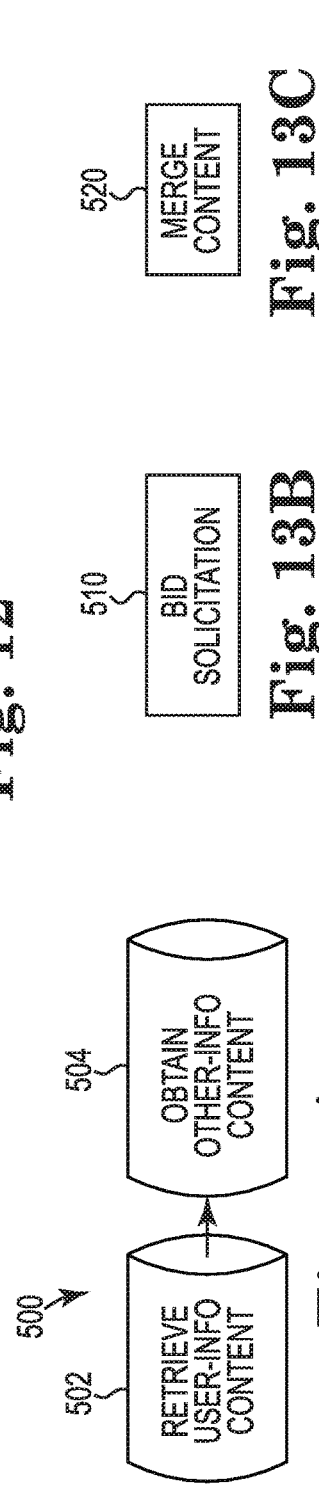
Fig. 13A
Fig. 13B
Fig. 13C

E-PAPER DISPLAY WRITER

BACKGROUND

Transaction media, such as credit cards, debit cards, identification cards, security badges, etc. have become ubiquitous and are used daily by nearly everyone in the developed nations. In most instances, the transaction media bear a logo or name of a vendor through whom the transaction media is obtained or where the transaction media can be used. In many instances, these transaction media allow information transactions and/or financial transactions to take place without paper.

BRIEF DESCRIPTION OF THE DRAWINGS

FIG. 12 is a diagram schematically illustrating a workflow involving a media writer, according to an example of the present disclosure.

FIG. 13A is a diagram schematically illustrating aspects of a workflow, including gathering variable content, according to an example of the present disclosure.

FIG. 13B is a diagram schematically illustrating aspects of a workflow, including gathering variable content, according to an example of the present disclosure.

FIG. 13C is a diagram schematically illustrating a content-handling component associated with a workflow, according to an example of the present disclosure.

DETAILED DESCRIPTION

Figure 1:
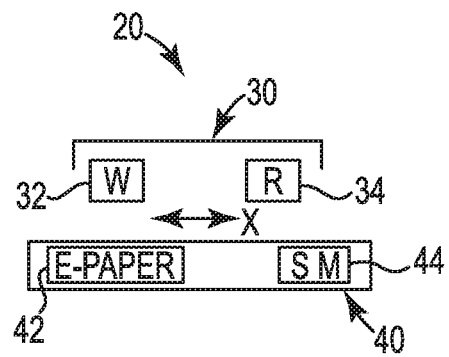
FIG. 1 is a side plan view schematically illustrating a media writer, according to an example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

In at least some examples of the present disclosure, a transaction media includes a re-writable information display in which the information that is displayed on at least one surface of the media is selectively changeable. In some examples, the re-writable information display comprises a passive electronic paper display. In one aspect, the electronic paper display is passive in the sense that it is re-writable and holds an image without being connected to an active power source during the writing process and/or after the writing is completed. Instead, as further described later, the passive electronic paper display is imaged in a non-contact manner in which the electronic paper display receives charges (emitted by a ion head) that travel through the air and then cause a response in charged particles within the electronic paper display.

In some examples, the transaction media additionally includes a computer readable storage medium, such as but not limited to, a magnetic strip, an integrated circuit chip, a bar code, or a radiofrequency identification (RFID) element.

In contrast, the visible surfaces of a traditional transaction card are fixed. In other words, traditional transaction cards are printed or formed in a manner in which the logos, graphics, etc. on those cards are not changeable. Accordingly, once a traditional type of transaction card is issued by the vendor and/or purchased by the consumer, the outward appearance of the card remains static.

However, with transaction media according to at least some examples of the present disclosure, the information display is changeable after the transaction media is first issued. Moreover, in some examples, the information display on the transaction media is changed each time that a transaction is performed with the transaction media.

In some examples, the media comprises a semi-rigid card made of generally non-conductive material, such as plastic or paper, which is suitable to support or embody a passive electronic paper display. In general terms, a transaction includes an exchange of information. The information relates to a wide variety of information, such as financial, security, personal, personnel, etc. In one example, the information visible on the information display enables or reflects a financial transaction. In another example, the information visible on the information display enables or reflects an information transaction, such as security status enabling entry or presence into a particular area. In another example, the information visible on the information display enables or reflects an information transaction, such as confirmation of registration for an event or location via display of an identity of the bearer of the transaction media. In one example, the information relates to a product, service, or inventory and the transaction media comprises a shelf tag label.

At least some examples of the present disclosure include a writer to read and write information on such transaction media. In some examples, the transaction media includes a passive electronic paper display and a storage medium. The writer comprises a first component to at least read the storage medium and a second component to write to the electronic paper display during relative movement between the second component and the media.

In some examples, the writer includes a third component to erase the electronic paper display prior to operation of the second component. In some implementations, the third component is operated at a first velocity different than a second velocity at which the second component is operated. In some examples, the second velocity differs from the first velocity by at least one of speed and direction.

In some examples, the first component is operated during at least a portion of the operation of at least the second component. In some examples, the first component is operated during at least a portion of the operation of the second component and during at least a portion of the operation of the third component.

In at least some examples of the present disclosure, the electronic paper display includes an imaging side and a viewing side opposite the imaging side, with the writer disposed on the imaging side. With this arrangement, a user is able to view erasure of the image on the electronic display (as it is being erased) and/or to view formation of the image on the electronic display (as it is being written) without the view being obscured by the movable portions of the writer. This arrangement greatly enhances the user's enjoyment while waiting for completion of the transaction as well as giving the user an opportunity to ensure that the displayed information accurately reflects the information transaction or financial transaction taking place.

In some examples, the storage medium on the transaction media comprises a magnetic strip and a writing station causes the first component and the third component to operate generally simultaneously at a first speed in a first direction (relative to the media) and causes the second component to operate at a different, second speed in the first direction (relative to the media). In one example, the writer station comprises a point-of-sale terminal.

In some examples, the storage medium on the transaction media comprises an integrated circuit chip. In a writing station, both the first component and the media are stationary during operation of the first component while operation of the third component occurs a first velocity and operation of the second component occurs at a second velocity. In one aspect, the second velocity differs from the first velocity according to at least one of speed and direction. In one example, the writing station comprises a point-of-sale terminal.

In one aspect, by providing a media with both a storage medium and an electronic paper display, a user or vendor is able to communicate with the media in at least several ways. First, via computer readable mechanisms communicative with the storage medium, the vendor is able to authenticate the media and the user, which further enables completing a financial transaction or information transaction. Moreover, in some examples, the storage medium reveals user-specific financial information or personal information used to perform the transaction. Second, via the electronic paper display, the user or vendor is able to visually ascertain some of the information stored on the storage medium and/or is able to receive promotional information of potential interest to the user of the media.

In addition, because the media and/or the writer are structured to enable the user to observe erasure and formation of images on the electronic paper display, the user is enticed to use the card more frequently, thereby enhancing commercial opportunities for card issuers and for vendors, merchants, etc. that accept use of the card.

In at least some examples of the present disclosure, a writing system enables a workflow in which the sequence of reading, erasing, and/or writing of information relative to the transaction media is managed to make effective use of the elapsing time during these functions. In some examples, the workflow includes receiving user identification information (such as a personal identification number (PIN) and verifying the identity of the user) after the actions of reading and erasing but before the action of writing. In some examples, the workflow includes obtaining variable content information via retrieving user specific data (based on the read information) and obtaining promotional content from external sources. This obtaining of variable content information is performed after the action of reading but before the action of writing. Moreover, in some examples, at least during (or after) the action of reading and erasing, the transaction media is in a state of movement relative to the writer during the receiving of user identification information such that the user becomes less conscious of the amount of time elapsing during the transaction. With this in mind, it will be understood that these examples reflect that the workflow is selectively controllable via a control portion to manage the sequence and timing of actions (e.g. reading, erasing, writing, obtaining external information, receiving user input, etc.) that occur during the transaction at the writing system involving the transaction media. In some examples, one goal of the workflow is to accomplish all the desired functions while minimizing the user's actual wait time and/or while minimizing their perception of the wait time.

These examples, and additional examples, are described and illustrated in association with FIGS. 1-16C.

FIG. 1 is a plan view of a media writer such as a writing system 20, according to one example of the present disclosure. As shown in FIG. 1, system 20 includes a writing module 30 and a transaction media 40. The writing module 30 includes a reading (R) portion 34 and a writing (W) portion 32. Meanwhile, the transaction media 40 includes a passive electronic paper (e-paper) display 42 and a storage medium 44. Relative movement (as represented by directional arrow X) between the writing module 30 and the transaction media 40 results reading the storage medium 44 and/or writing on the e-paper display 42. In one aspect, the particular physical location of the reading portion 34 and the writing portion 32 relative to each other (and relative to a transaction media 40) takes different forms, as described throughout the present disclosure. In another aspect, the representation of the e-paper display 42 and storage medium 44 in FIG. 1 do not necessarily indicate a particular size, shape, and/or location of those respective elements. Rather, FIG. 1 represents merely that the e-paper display 42 and storage medium 44 are present and accessible somewhere on transaction media 40. In addition, more detailed examples of one type of structure of the e-paper display 42 are described and illustrated in association with at least FIGS. 15-16C.

Figure 2A:
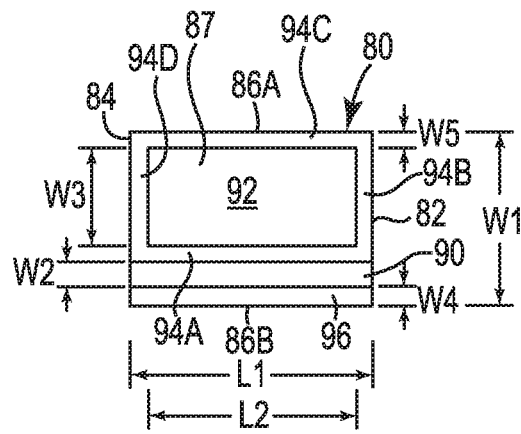
FIG. 2A is a top plan view schematically illustrating a transaction media, according to an example of the present disclosure.

FIG. 2A is a top plan view of a transaction media 80, according to one example of the present disclosure. The media 80 provides one example of the media 40 (FIG. 1). As shown in FIG. 2A, media 80 includes a first end 82 and an opposite second end 84, as well as opposite side edges 86A, 86B. In some examples of media 80, computer-readable storage medium 90 extends generally the entire length (L1) of the media 80 as shown in FIG. 2A. However, in other examples, computer-readable storage medium 90 has other sizes (less than the entire length L1 of media 80) and/or other shapes (such as a square shape).

In some examples, the computer-readable storage medium is a non-volatile or non-transitory computer-readable storage medium. In some examples, the computer-readable storage medium 90 comprises a magnetic strip suitable for non-volatile magnetic storage of information.

In addition, media 80 includes a passive e-paper display 92. In general terms, the e-paper display 92 can have a wide variety of lengths and widths occupying a portion of the surface area on the transaction media 80. However, in some instances, the width and/or length of the e-paper display 92 is limited to provide space on the media 80 for a storage medium, signature line, fixed graphics, etc.

As shown in FIG. 2A, in some examples, the e-paper display 92 has a length (L2) that is about 90 percent of the total length (L1) of the media 80. In some examples, the e-paper display 92 has a length that matches the total length (L1) of the media 80. In some examples, length (L1) corresponds to a length of 3.37 inches for a standard credit card.

As further shown in FIG. 2A, media 80 has a width (W1) while e-paper display 92 has a width (W3) and storage medium 90 has a width (W2). In some examples, the combined width (W2+W3) of the storage medium 90 and of the e-paper display is greater than 50 percent of the total width (W1) of transaction media 80. In some examples, the combined width (W2+W3) is greater than 75% of the total width (W1). In some examples, the combined width (W2+W3) is greater than 90% of the total width (W1).

In some examples, media 80 includes border portions 94A, 94B, 940, 94D, which together generally surround the e-paper display 92. Media 80 includes a side border portion 96 that extends generally parallel to storage medium 90. In some examples, the side border portion 96 has a width (W4) that is less than 10 percent of the total width (W1) of media 80. In some examples, width (W5) of side border portion 94C is less than 20 percent of the total width (W1) of media 80.

In some examples, width (W5) of side border portion 94C is less than 10 percent of the total width (W1) of media 80. In this example, when media 80 has a total width of about 2.125 inches (as in a standard credit card format), the width (W5) of side border 94C would be less than 0.2 inches. In such an arrangement, the width (W5) of side border 940 is unsuited for gripping to "swipe" the media 80 through a traditional format card reader while still ensuring visibility of the e-paper display 92 and while maintaining a suitable flatness of media 80. In other words, at least some traditional swiping-type readers for reading magnetic strips on cards are poorly suited to handle transaction media including an e-paper display 92.

On the other hand, at least some examples of the present disclosure provide for automated workflow including automated movement of the transaction media 80 (and 40 in FIG. 1) relative to a writing module, thereby providing controlled sequence, timing, direction, and speed of reading, erasing, and/or writing to the e-paper display 92. In some examples, the automated workflow includes maintaining suitable flatness of the transaction media 40, 80 during such operations to achieve quality imaging.

With further reference to FIG. 1, in some examples, when relative motion occurs between the writing module 30 and the media 40 (80 in FIG. 2A), the reading portion 34 reads information from the storage medium 44 (92 in FIG. 2A) at a first speed and the writing portion 32 writes information to the e-paper display 42 (92 in FIG. 2A) at a second speed, wherein the writing occurs during a period of time separate from the reading from the storage medium 44 (90 in FIG. 2A). In some examples, the first speed is substantially faster than the second speed. In one example the reading speed is about 2-3 times faster than the writing speed, such as one in which the reading speed is about 4-5 inches per second while the writing speed is about 1-2 inches per second. In some examples, the reading speed cannot be less than 4-5 inches per second because the inductive nature of the magnetic reading head.

In some examples that include an erasing function, the erasing speed of the e-paper display 42, 92 is generally about the same as the reading speed of the storage medium 40, 90. Accordingly, in some examples, the erasing of the electronic paper display 42 (FIG. 1), 92 (FIG. 2) is performed generally simultaneously with the reading of the storage medium 40 (FIG. 1), 90 (FIG. 2).

Figure 3A:
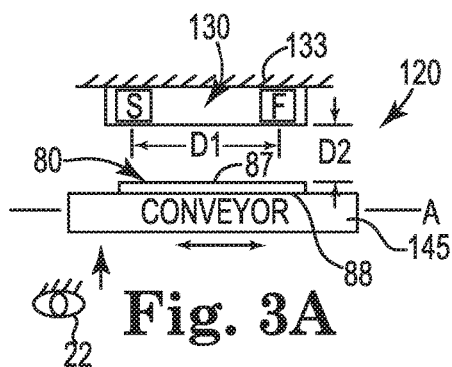
FIG. 3A is a side plan view schematically illustrating a media writer, according to an example of the present disclosure.
Figure 3B:
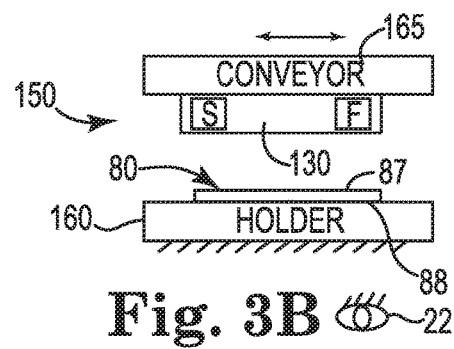
FIG. 3B is a side plan view schematically illustrating a media writer, according to an example of the present disclosure

In some examples, relative motion between the writing module 30 and the transaction media 40 is controlled via a positioning mechanism, some examples of which are described and illustrated in association with at least FIGS. 3A-3B. Additional examples of a positioning mechanism are later described in association with at least FIGS. 6A-6B, 7A, 8A-8C, and 10A-10C.

Figure 2B:
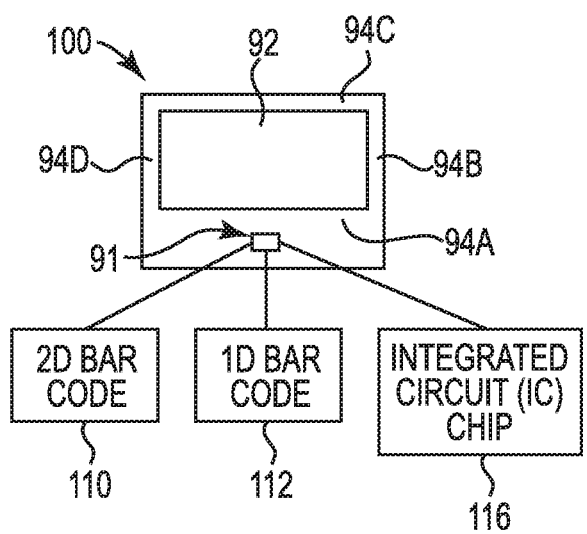
FIG. 2B is a diagram schematically illustrating a transaction media and a gallery of storage mediums, according to an example of the present disclosure.
Figure 2C:
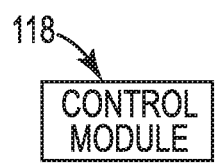
FIG. 2C is a block diagram schematically illustrating a control module, according to an example of the present disclosure.

FIG. 2B is a diagram 101 schematically illustrating a gallery of different storage mediums for a media 100, according to an example of the present disclosure. In one example, media 100 includes at least some of substantially the same features and attributes as media 80 (FIG. 2A), except for replacing a magnetic strip 90 with other types of storage mediums. As shown in FIG. 2B, media 100 includes e-paper display 92 and a storage medium 91, which in some examples is a two-dimensional (2D) bar code 110, a onedimensional (1D) bar code 112, or an integrated circuit (IC) chip 116. These example storage mediums can be arranged in a variety shapes, sizes, and locations relative to the e-paper display 92, and therefore are not limited to the arrangement shown in FIG. 2B. In some examples, a writing system 20 includes a control module 118 as shown in FIG. 2C to control the writing module 30 and/or positioning mechanism. In particular, in one example, the control module 118 provides tracking, control, and/or monitoring of the functions (e.g. reading, writing, erasing) of the writing module 30 and of the functions (e.g. speed, direction, position, timing, sequence) of the positioning mechanism of the writing system 20. In some examples, control module 118 is consistent with, and/or includes at least some of the features and attributes of, a control portion 360 as later described and illustrated in association with at least FIGS. 11A-11O.

FIG. 3A is a side plan view schematically illustrating a media writing system 120 including a positioning system, according to one example of the present disclosure. In one example, system 120 includes at least substantially the same features and attributes as system 20 (as previously described in association with FIG. 1). In some examples, system 120 includes control module 118 (FIG. 2C). As shown in FIG. 3A, system 120 includes a writing module 130, a transaction media 80, and a conveyor 145. The writing module 130 has a fixed position (as represented via lines 133) and first (F) component is spaced apart, by a fixed distance D1, from a second (S) component. In one example, the first component (F) includes a reading (R) portion 34 and the second component (S) includes a writing (W) portion 32.

The conveyor 145 supports media 80 and is movable along a plane P, as represented via directional arrow A, to pass underneath the writing module 130 while maintaining media 80 in a substantially planar path and at a fixed vertical distance (D2) relative to writing module 130.

FIG. 3B is a side plan view schematically illustrating a writing system 150 including a positioning system, according to one example of the present disclosure. In one example, system 150 includes at least substantially the same features and attributes as system 120, as previously described in association with FIG. 3A, except in this instance the media 80 is held in a fixed position via a holder 160 while writing module 130 is moved relative to the media 80 via conveyor 165. Again, writing module 130 is configured with first (F) component (e.g. a reading component) being spaced apart, by a fixed distance D1, from a second (S) component (e.g. a writing component).

In one or both of the writing systems 120, 150, the respective conveyor 145 or holder 160 is transparent or otherwise arranged to enable viewing the media 140 during imaging performed by the writing portion of the second component (S), as represented by eye icon 22 shown in FIGS. 3A and 3B. Moreover, an e-paper display 92 of transaction media 80 is constructed to enable viewing the imaging on the side of transaction media 80 facing the respective conveyor 145 (FIG. 3A) or the respective holder 160 (FIG. 3B). In this arrangement, the e-paper display 92 has a structure at least consistent with an electronic paper display, as later described and illustrated in association with at least FIG. 16C.

Figure 4A:
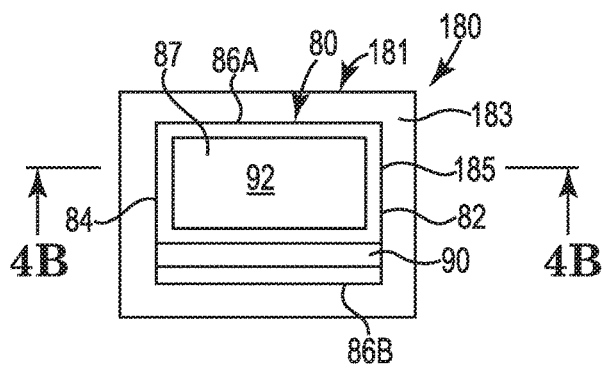
FIG. 4A is a top plan view schematically illustrating a transaction media assembly, according to an example of the present disclosure.

With this in mind, as shown in the top plan view of FIG. 4A, in some examples the media 80 forms part of a media assembly 180 including a holder frame 181 to facilitate viewing the formation of an image on the media 80. The holder frame 181 includes a border portion 183 generally surrounding the ends 82, 84 and side edges 86A, 86B of the transaction media 80 with an inner edge 185 of holder frame 181 being in contact with the outer ends/edges of the transaction media 80.

Figure 4B:
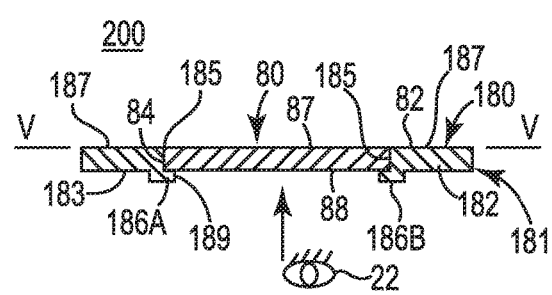
FIG. 4B is a side sectional view as taken along lines 4B-4B in FIG. 4A, and schematically illustrating a transaction media assembly, according to an example of the present disclosure.

FIG. 4B is a side sectional view as taken along lines 4B-4B of FIG. 4A, according to one example of the present disclosure. As shown in FIG. 4B, holder 181 includes border portion 183 and inner edge 185 (as also shown in FIG. 4A) but further includes flanges 186A, 186B to support transaction media 80 to be releasably secured within holder frame 181. With this configuration, the flanges 186A/186B define an opening 189 that serves as a window through which a viewer can view (as represented by the eye icon 22) a viewing side 88 of transaction media 80 (opposite an imaging side 87) to see the image being formed on the e-paper display 92 of media 80.

In some examples, holder frame 181 is sized and shaped so that with flanges 186A, 186B supporting transaction media 80, a face 87 of transaction media 80 is positioned to extend in generally the same plane (represented via V) as a face 187 of border portion 183.

Figure 5:
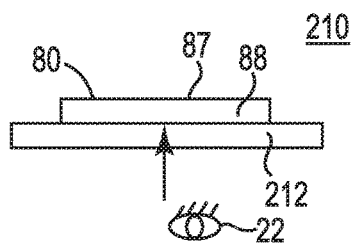
FIG. 5 is a side plan view schematically illustrating a transaction media assembly, according to an example of the present disclosure.

FIG. 5 is a side plan view schematically illustrating a media 80 and holder assembly 210, according to one example of the present disclosure. As shown in FIG. 5, transaction media 80 sits on top of a holder frame 212 without any window or opening like opening 189 in the example of FIG. 4B. However, in the assembly 210 of FIG. 5, at least a portion of holder frame 212 is transparent to enable a viewer (represented by the eye icon 22) to view the face 88 of transaction media 140 through the holder frame 212 and observe formation of an image on an e-paper display 92 of transaction media 140.

As previously mentioned, by enabling a user to view erasure and/or formation of an image on the e-paper display 92 of a transaction media, the media writing system (in accordance with some examples of the present disclosure) provides a workflow that includes a convenient, enjoyable activity for the user while other more mundane aspects of a transaction via media 140 are taking place.

Figure 6A:
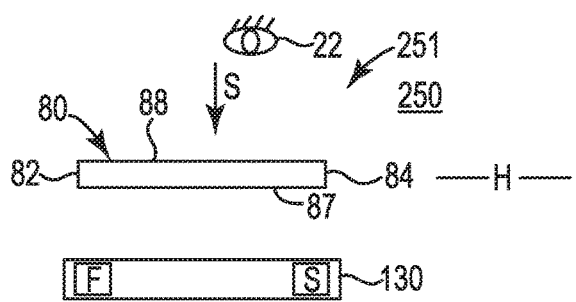
FIG. 6A is a side plan view schematically illustrating a transaction media writer, according to an example of the present disclosure.

With this in mind, FIG. 6A is a diagram 250 including a side plan view schematically illustrating a system 251 similar to systems 120, 150 of FIGS. 3A, 3B (according to one example of the present disclosure) and arranged to enable a viewer (represented via the eye icon 22) to have a top plan view of the transaction media 80. In particular, system 251 enables a user to have a top plan view of an e-paper display 42 on transaction media 80 during formation of an image on transaction media 80 performed via a writing module 130 positioned vertically below the transaction media 80. In this arrangement, the line of sight (S) is generally transverse to a plane (represented by line H) through which the transaction media 80 generally extends.

Figure 6B:
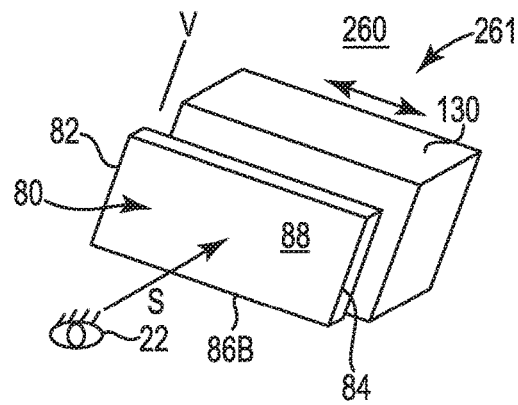
FIG. 6B is a perspective view schematically illustrating a transaction media writer, according to an example of the present disclosure.

Similarly, FIG. 6B is a diagram 260 including a perspective view schematically illustrating a system 261 (according to one example of the present disclosure) arranged to enable a viewer (represented via the eye icon 22) to have a side plan view of the transaction media 80, and in particular, a side plan view of an e-paper display 92 on transaction media 80 during formation of an image on transaction media 80 performed via a writing module 130 positioned behind the transaction media 80. In one aspect, the line of sight (represented by line S) is generally transverse to a generally vertical plane (represented by line Y).

Figure 7A:
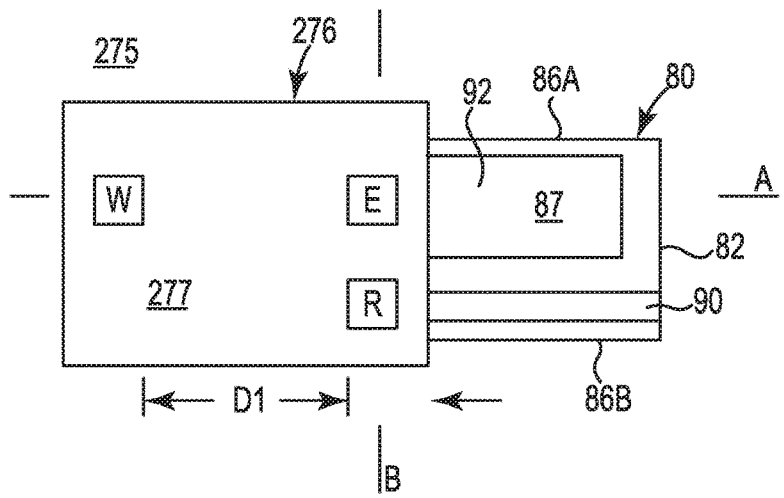
FIG. 7A is a top plan view schematically illustrating a media writer, according to an example of the present disclosure.

FIG. 7A is a top plan view schematically illustrating a writing system 275, according to one example of the present disclosure. In one example, the system 275 is at least consistent with, and/or includes at least substantially the same features and attributes as, the respective writing systems 120, 150, as previously described in association with at least FIGS. 3A, 3B.

As shown in FIG. 7A, the system 275 includes a writing module 276 having an erase portion (E), a reading portion (R), and a writing portion (W), such as magnetic reading head. The system 275 aligns the transaction media 80 to cause the e-paper display 92 to move in alignment with the erasing portion E to erase any existing (i.e. prior) image on e-paper display 92 and to cause the storage medium 90 to move in alignment with the reading (R) portion to read and obtain user-specific information from the storage medium 90 (e.g. a magnetic strip). As shown in FIG. 7A, in some examples the writing portion (W) is generally in alignment with the erasing portion (E) and the guided path of the e-paper display 92. In one example, the erasing (E) portion is generally aligned with reading (R) portion along a common plane B.

With the general configuration shown in FIG. 7A, in some examples the erase portion (E) will be acting on the e-paper display 92 at generally the same time as the reading portion (R) acts to read the information on the storage medium 90. Stated differently, in some examples the erasing of an image on the e-paper display 92 occurs in parallel with reading of information from the storage medium 90 (e.g. a magnetic strip). In general terms, the respective erasing and reading operations are performed at a first speed, such as 4-5 inches per second, suitable for reading storage mediums such as magnetic strips or bar codes.

In some examples, the computer readable storage medium 90 is replaced with one of the storage mediums 110, 112, 116 described in association with FIG. 2B. In some examples, when the storage medium is a bar code (e.g. 110, 112 in FIG. 2B), the reading (R) portion in the system 275 in FIG. 7A comprises a bar code reader, which is based on laser, CCD, or other technologies. In some examples, the bar code reader reads a storage medium on media 80 in a static position while in some examples, the bar code reader reads a storage medium on media 80 while media 80 is moving relative to the bar coder reader.

In one aspect, it will be understood that the arrangement shown in FIG. 7A does not necessarily exclude viewing of image formation by a user, such as the examples previously described and illustrated in association with FIGS. 4-6B. Rather, FIG. 7A highlights the alignment of the e-paper display 92 relative to an erasing portion (E) and highlights the alignment of the storage medium 90 of transaction media 80 relative to reading portion (R). FIG. 7A also illustrates the spacing (by distance D1) of the writing portion (W) from the generally co-located erase portion (E) and read portion (R). Further details regarding the distance D1 is described later in association with at least FIGS. 8A-8C.

Figure 7B:
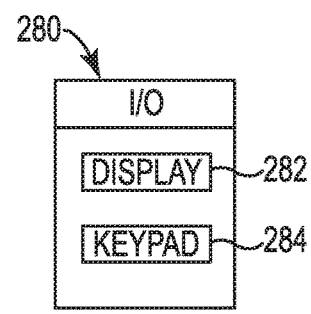
FIG. 7B is a block diagram schematically illustrating an input/output module, according to an example of the present disclosure.

FIG. 7B is a block diagram of a schematically illustrating an input/output module 280, according to an example of the present disclosure. As shown in FIG. 7B, input/output module 280 includes a display 282 and a keypad 284. In some examples, the input/output module 280 is in communication with and/or otherwise cooperable with writing module 276 of FIG. 7A to perform workflow operations (as further described later in association with at least FIG. 12) regarding the transaction media 40, 80. In one example, keypad 284 receives a user identification (ID), such as a personal identification number (PIN) or other identification for use in such workflow operations. In some examples, the ID is stored on one of the storage mediums 90 (FIG. 2A) 110, 112, 116 (FIG. 2B). In some examples, storage medium 110, 112 do not store an ID, such as a PIN.

Figure 7C:
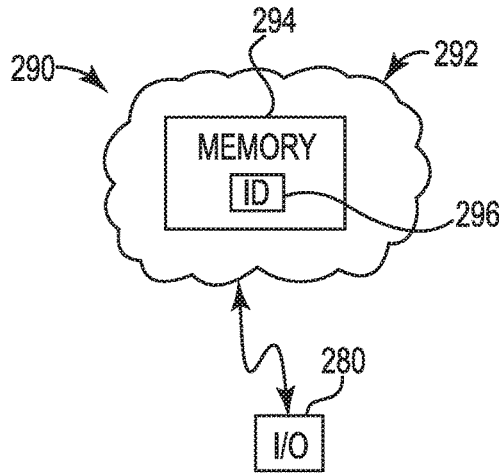
FIG. 7C is a diagram schematically illustrating an input/output module in communication with a cloud resource, according to an example of the present disclosure.

FIG. 7C is a diagram schematically illustrating the input/output module 280 in communication with a cloud resource 292, according to an example of the present disclosure. As shown in FIG. 7C, cloud resource 292 includes a memory 294 storing an identification (ID) 296 associated with a user of input/output module 280. In some examples, storing the ID in cloud resource 292 replaces storing the ID in one of the storage mediums of media 80, 100 and is accessible to verify user identification, as part of the later described workflow operations (FIG. 12)

Figure 8A:
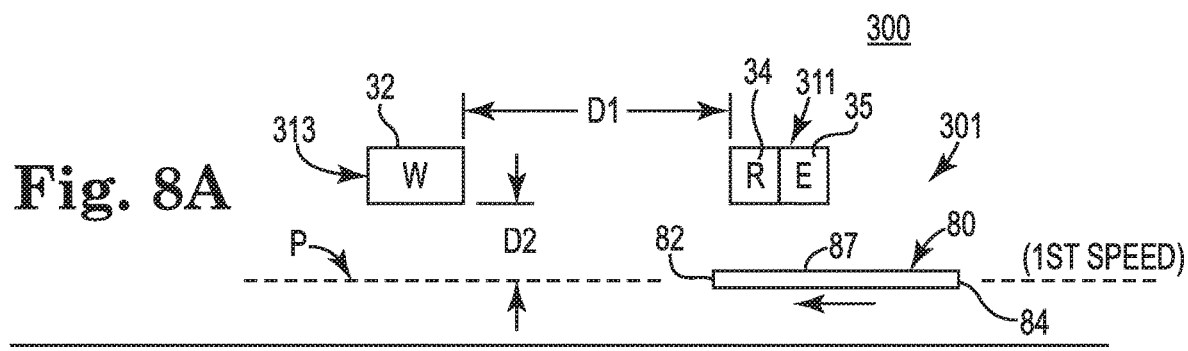
FIGS. 8A, 8B, 8C are side plan views each schematically illustrating a media writer interacting with a media, according to an example of the present disclosure.
Figure 8B:
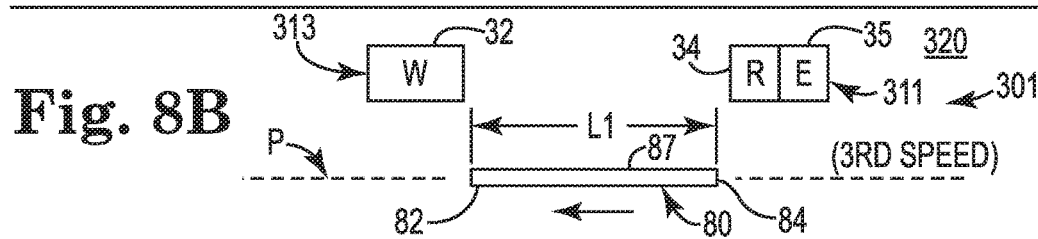

FIGS. 8A-8B are a series of diagrams 300, 320, 325, each including a side view schematically illustrating one reading and writing operation on a media, according to one example of the present disclosure. In one example, system 301 is at least consistent with, and/or includes at least substantially the same features and attributes as, at least some of the functions, components, and systems previously described and illustrated in association with FIGS. 1-7C.

In some examples, the system 301 functions as a writing station, such as a point-of-sale terminal, for processing financial transaction media, such as credit cards, debit cards, gift cards, etc. In some examples, the system 301 functions as a writing station for processing information transaction media, such as security badges, personnel identification badges, entrance identification cards, identification cards, driver license cards, professional license cards, shelf label tags, etc.

As shown in FIG. 8A, relative motion between media 80 and the read/erase station (R/E) occurs via a positioning mechanism at a first speed and in a first direction to enable both reading of a storage medium 90 of media 80 and erasing of an e-paper display 92 of media 80. It will be understood that in some examples in which the reading portion of the read/erase (R/E) station comprises a bar code reader, the reading action can occur when media 80 is stationary relative to the read/erase (R/E) station. Accordingly, in some examples the reading action occurs before the erasing action. In one aspect, the read/erase station (R/E) 311 is spaced apart by a fixed distance D1 from the writing station (W) 313.

In one aspect, the distance D1 is generally minimized to minimize the total amount of time spent performing workflow operations (as later described in association with at least FIG. 12). In some examples, distance D1 is selected to be the longer of: (1) the time for charges to dissipate from the surface of the e-paper display 92 after an erasing action at R/E station 311; and (2) the time or distance to complete reading of the storage medium at R/E station 311. In the latter case when storage medium 90 comprises a magnetic strip, this time or distance depends on the physical length of the magnetic strip that is encoded with information pertinent to workflow operations associated with at least some examples of the present disclosure. Similarly, when storage medium is a bar code, the time or distance to complete reading depends on the size, shape, and/or location of the bar code on the transaction media 40, 80, or which type of bar code reading technology is employed.

Stated differently, distance D1 is selected to provide an adequate distance (for relative motion of media 40, 80) to provide enough time for both of these actions (e.g. dissipation of surface charges and completion of reading) to be completed before writing commences. It will be further understood that the selected minimum distance D1 is, of course, related to a selected speed of relative movement as the media 80 travels from the R/E station 311 to the writing (W) station 313.

Once relative motion has occurred between the read/erase station (R/E) 311 and media 80 to complete the erasing action and/or the reading action, the media 80 reaches an intermediate position as shown in FIG. 8B. As shown in FIG. 8B, a first end 82 of media 80 has not yet reached the writing station (W) 313, such that no writing operations have commenced.

In some examples, as shown in FIG. 8B, the passage of second end 84 of media 80 beyond the reading/erasing station (R/E) 311 corresponds with the conclusion of read/erase operations. However, in some examples, the read/erase operations conclude before second end 84 of media 80 passes entirely beyond the reading/erasing stations (R/E) 311.

Figure 8C:
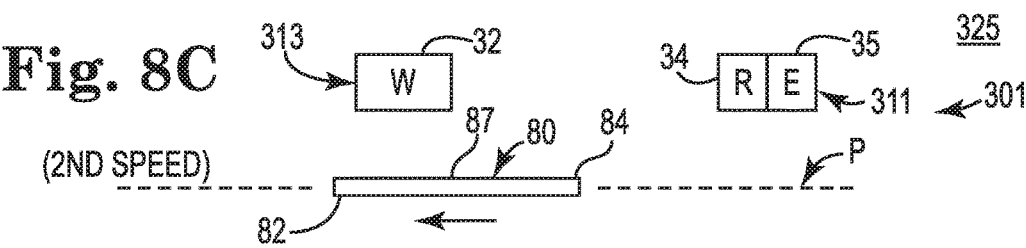

With this spaced configuration shown in FIGS. 8A-8C, the operations on media 80 that were performed at the first, faster speed at read/erase station 311 will have been completed before the writing station 313 begins performing operations on media 80, which occurs at a second speed that is substantially slower than the first speed. In some examples, a length (L2) of card 310 is the same as or less than the distance (D1) between the read/erase station 311 and the writing station 313.

In one aspect, as the media 80 is in an intermediate position as media 80 is moved from the read/erase station 311 toward the writing station 313, the media 80 moves at a third speed which can be the same as one of the first speed or second speed or which can be different than the first speed or second speed. In some examples, the third speed is non-uniform. In one implementation, a non-uniform third speed is employed when using a transaction media configuration in which the storage medium is an integrated circuit (IC) chip 116, as illustrated in FIG. 2B.

In one aspect, after accounting for the distance (D1) between the read/erase station 311 and the writing station 313, the third speed is selected to ensure that residual charges on the surface of the e-paper display 92 have sufficiently dissipated (or to ensure that reading operations at read/erase station 311) have been completed before the start of any writing action at writing station 313.

As shown in FIG. 8C, further relative motion between the media 80 and the writing station 313 results in causing formation of an image on the e-paper display (e.g. display 92 in FIG. 2A, 7A) of media 80.

In some examples, the erase portion E of the read/erase station 311 is at least as wide as the e-paper display 92. In some examples, the erase portion E comprises a page wide element or array to perform erasing on a page wide e-paper display 92 of a media 80.

In one aspect, FIGS. 8A-8C illustrate that the sequence of erasing and reading followed by writing, along with a longitudinal spacing between those respective actions, enables a single pass operation to write an image on an e-paper display of a transaction media.

In some examples, the writing system 301 is employed as part of a workflow 401 as described later in association with at least FIGS. 12-13C. In such a workflow, additional functions are performed before, during, between, and/or after the respective functions of erasing, reading, and writing on the media 310. In addition, further details regarding example structures of a passive electronic paper display are later described and illustrated in association with at least FIGS. 15-16C.

Figure 9:
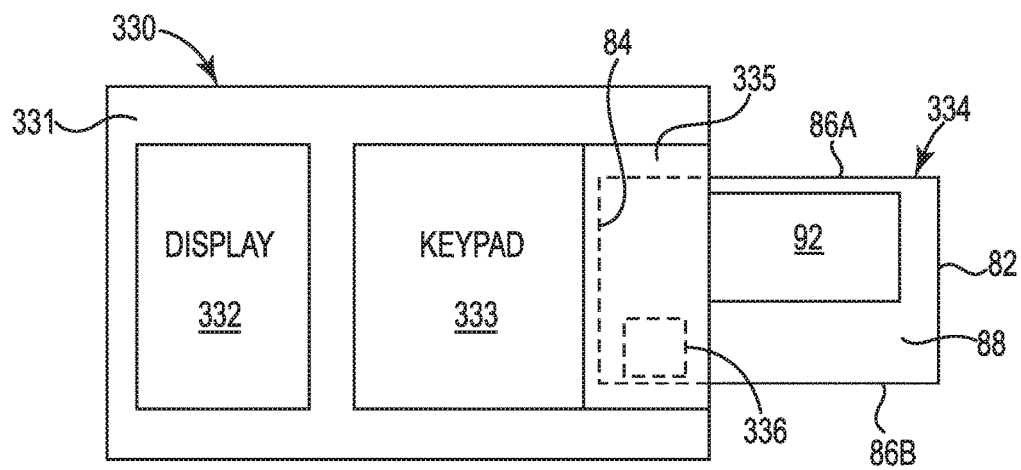
FIG. 9 is a top plan view schematically illustrating a media writer, according to one example of the present disclosure.

FIG. 9 is a top plan view schematically illustrating a writing station 330, according to one example of the present disclosure. In some examples, the writing station 330 functions as a point-of-sale terminal for processing financial transaction media, such as credit cards, debit cards, gift cards, etc. In some examples, the writing station 330 functions as a terminal for information transaction media, such as processing security badges, personnel identification badges, entrance identification cards, identification cards, driver license cards, professional license cards, shelf label tags, etc.

As shown in FIG. 9, in one example, the writing station 330 comprises a housing 331, a display 332, and a keypad 333 (e.g. for inputting information). It will be understood that display 332 and keypad 333 are merely examples, and that in some implementations, the functions and components of display 332 and keypad 333 are combined into a touch-screen display.

As further shown in FIG. 9, station 330 includes a media interface portion 335 for removably receiving a media 334, such as a financial transaction media or an information transaction media. In some examples, the media 334 is like media 80, except that media 334 specifically includes (as its non-transitory computer readable medium) an integrated circuit chip 336 affixed to or embedded within the media 334.

In examples in which the media 334 comprises a financial transaction media, the integrated circuit chip 336 tracks, receives, provides, stores, and/or otherwise controls information according to the EMV financial protocol. In some instances, these types of card adhering to the EMV financial transaction protocol are referred to as "chip-and-pin" cards. In some examples, an EMV-type protocol is applied to information transaction media.

As shown in FIG. 9, the integrated circuit chip 336 is present on media 334 in combination with an e-paper display 92. In some examples, the integrated circuit chip 336 and one side of the e-paper display 92 are located on the same side of media 334. In some examples, an opposite side of the media 334 additionally comprises a second storage medium embodied as a magnetic strip, similar to magnetic strip 90 shown in FIG. 2A. However, this second storage medium is not shown in FIG. 9 for illustrative clarity.

As further shown in FIG. 9, an end 84 of media 334 bearing the integrated circuit chip is removably received within the media interface 335 of station 330 to releasably hold media 334 relative to housing 331. In this position, at least a portion of e-paper display 92 of media 334 remains external to the housing 331 of terminal 330 and, therefore, is visible to the user during the financial transaction or information transaction.

Figure 10A:
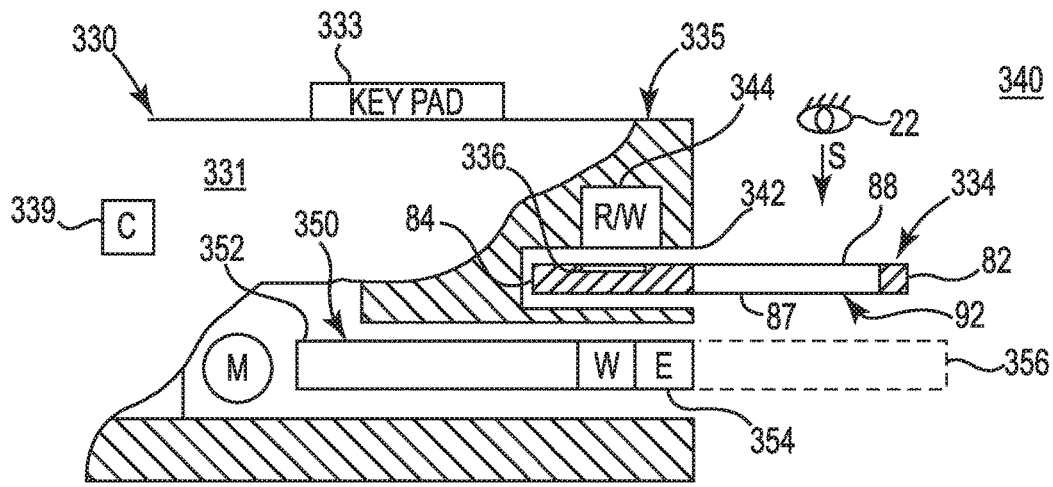
FIGS. 10A, 10B, 10C are partial side sectional views each schematically illustrating a media writer interacting with a media, according to an example of the present disclosure.
Figure 10B:
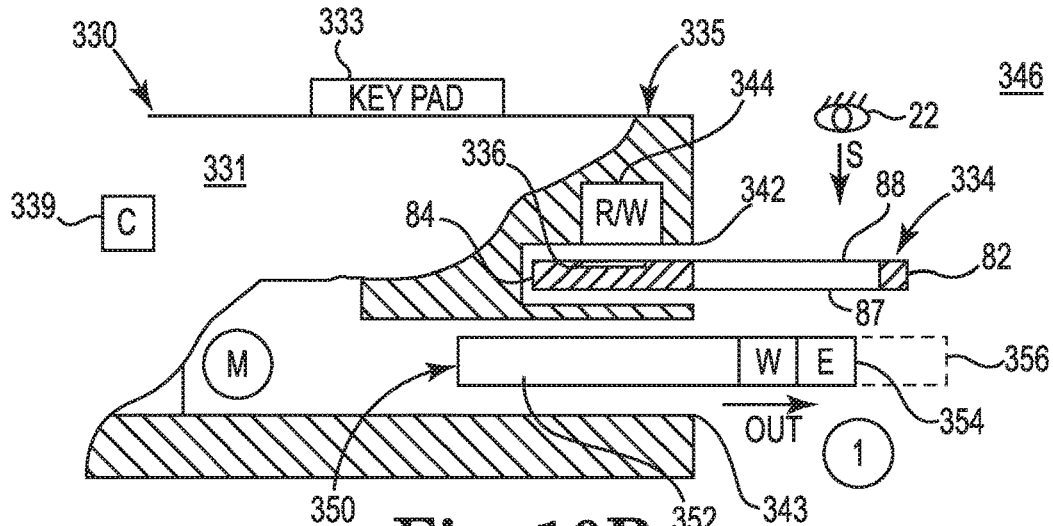
Figure 10C:
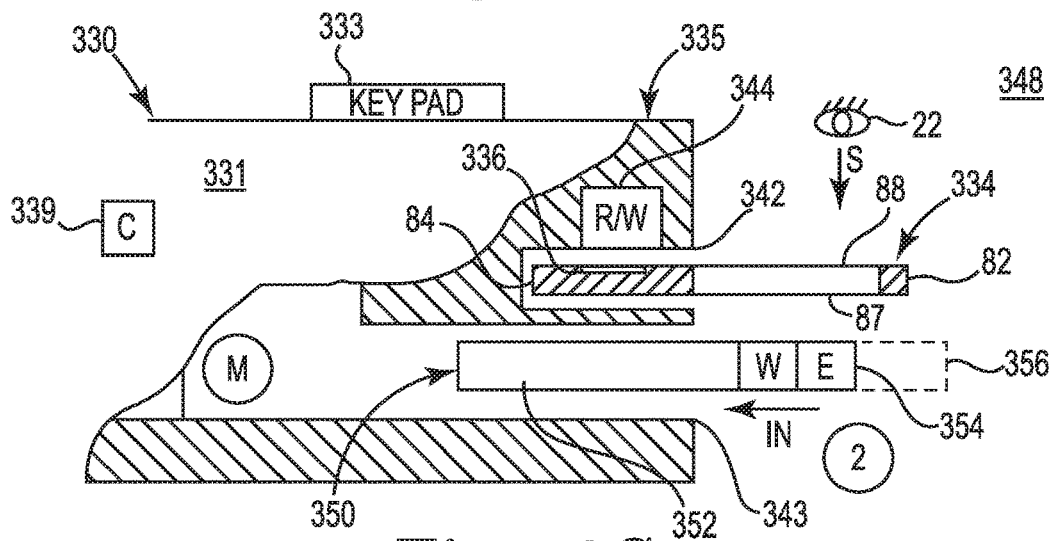

FIGS. 10A-10C are a series of diagrams 340, 346, 348 each including a side sectional view schematically illustrating at least a portion of workflow of a financial transaction or information transaction of a media 334 at station 330, according to one example of the present disclosure. In one example, the station 330 shown in FIGS. 10A-10C is consistent with, and/or includes at least substantially the same features and attributes as, station 330 of FIG. 9.

As shown in FIG. 10A, media interface portion 335 within a housing of station 330 includes a first slot 342 to at least partially, removably receive media 334, a read/write (R/W) head 344 associated with the first slot 342, and a tray 350. In some examples, the station 330 includes a control portion 339 to control operations of the media interface portion 335 relative to media 334. The tray 350 forms at least a portion of a positioning mechanism and includes a first end 352 operably coupled to a mover (M) and an opposite second end 354 support a writing/erasing (W/E) head.

As shown in FIG. 10A, the first slot 342 is sized and shaped to slidably receive one end 84 of media 334 to position integrated circuit chip 336 in operable communication with a stationary read/write head (R/W) 344 of media interface portion 335 and to securely, releasably hold media 334 in a stable position relative to housing 331. In one aspect, in this position the IC chip 336 is sometimes referred to as being co-located with the read/write (R/W) head 344. In this position, the remaining portion of media 334 extends external of housing 331, thereby making e-paper display 92 visible to an operator of station 330 or a customer. Moreover, in this implementation, a "viewing" side 88 of e-paper display 92 faces upward while an "imaging" side 87 of e-paper display 92 faces downward.

As further shown in FIG. 10A, tray 350 is in a recessed/storage position within a second slot 343 of housing 331 and is aligned to travel along a path represented by dashed lines 356. In this position and during initial insertion of media 334 into first slot 342, the write/erase (W/E) head is not in active engagement relative to e-paper display 92 of media 334. In one aspect, in this position, the media has zero speed and a neutral direction. However, as shown in FIG. 10B, while integrated circuit chip 336 remains in operable communication with reader 344 to authenticate the user and/or perform a transaction via the station 330, control portion 339 initiates movement of tray 350 to cause erasure of e-paper display 92. In particular, as shown in FIG. 10B, tray 350 moves out of second slot 343 (as represented by the directional arrow marked OUT) at a first speed (represented by encircled numeral 1) to move erasure portion of write/erasure (W/E) head relative to the media 334 to cause erasure of the electronic paper display 92 of media 334. Specific details regarding the mechanism of erasure is described later in association with at least FIGS. 15-16C. In some examples, the first speed is about 4-5 inches per second.

As further shown in FIG. 10B, during this erasure the tray 350 moves along the imaging side 87 of the media 334 opposite the viewing side 88 (represented by directional arrow E and the eye icon 22) of media 334. Accordingly, the viewer typically does not see the tray 350 during such movement. The tray 350 continues this movement until end 354 of tray 350 extends its full range of motion, as represented by dashed box 356.

Following the erasure, a predetermined delay occurs to allow the pigments in e-paper display 92 to complete their response to the erasure and/or for charges on the surface of the e-paper display 92 to dissipate. In some examples, the predetermined delay is set at 1-2 seconds but in some examples, the delay greater than 1-2 seconds in accordance with an overall workflow, as further described later in association with at least FIG. 12.

After the delay, the tray 350 reverses direction and begins movement toward the housing 331 (as represented by directional arrow marked IN) at a second speed (as represented by encircled numeral 2) that is substantially less than the first speed. In one example, the second speed is about 1-2 inches per second to allow sufficient time for charges to be applied and for the pigments in the e-paper display 92 to respond.

During this inward movement of tray 350, the writing portion of write/erasure (W/E) head writes an image, via imaging side 87, on e-paper display 92 that is visible or viewable on viewing side 88, as shown in FIG. 10O. Again, during such movement the tray 350 is hidden from the top view of the viewer such that the user can readily view the writing of the image (on the electronic paper display 92) as the writing occurs. In some examples, the writing occurs at the second speed (e.g. 1-2 inches/second) that is substantially slower (e.g. at least 2-3 times slower) than the first speed (e.g. 4-5 inches/second) at which e-paper display 92 is erased.

In some examples, a workflow as described later in association with at least FIGS. 12-13C is applicable to the operation of writing station 330. In such a workflow, additional functions are performed before, during, between, and/or after the respective functions of erasing, reading, and writing on the media 310. In some examples of a workflow, during reading via reader 344 and/or during erasure, a user enters their personal identification number (PIN) at keypad 333 for identity verification. In some examples of a workflow, during reading, erasure, and/or the predetermined delay (between erasure and writing), the system gathers variable content and generates an image for writing on e-paper display 92.

In addition, further details regarding an example structure of a passive e-paper display of the type to be employed on media 334 are later described and illustrated in association with at least FIG. 16C and more generally in association with at least FIGS. 15-16B.

Figure 11A:
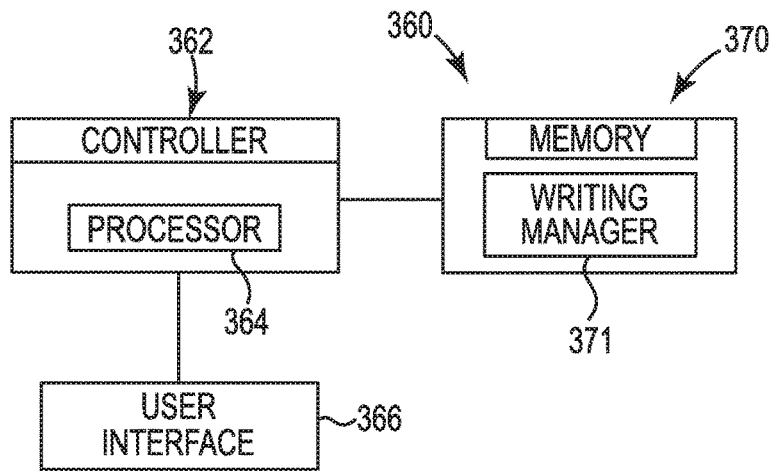
FIG. 11A is a block diagram schematically illustrating a control portion, according to an example of the present disclosure.

FIG. 11A is a block diagram schematically illustrating a control portion 360 of a writing system, according to one example of the present disclosure. As shown in FIG. 11A, control portion 360 is consistent with, and/or includes at least some of substantially the same features and attributes as, control module 118, 339 as previously described in association with at least FIGS. 2C, 10A-10C, respectively. In some examples, control portion 360 includes a controller 362, a memory 370, and a user interface 366. In one example, memory 370 stores a writing manager 371 for managing the relative movement between a writing module and a media.

With further reference to FIG. 11A, in general terms controller 362 of control portion 360 comprises at least one processor 364 and associated memories that are in communication with memory 370 to generate control signals directing operation of at least some components of the systems and components previously described in association with at least FIGS. 1-10C. In some examples, these generated control signals include, but are not limited to, directing operation of a writing system, including erasing and writing to an e-paper display of a media and reading a storage medium of the media, during relative movement between the writing system and the media. In particular, in response to or based upon commands received via a user interface 366 and/or machine readable instructions (including software), controller 362 generates control signals to direct operation of a writing system 20, 120, 150, 180, 250, 275, 301, and 330 in accordance with at least some of the previously described examples and/or later described examples of the present disclosure. In one example, controller 362 is embodied in a general purpose computer and communicates with a writing system while in other examples, controller 362 is incorporated within the writing system.

For purposes of this application, in reference to the controller 362, the term "processor" shall mean a presently developed or future developed processor (or processing resources) that executes sequences of machine readable instructions (such as but not limited to software) contained in a memory. Execution of the sequences of machine readable instructions, such as those provided via a writing module, memory 370 of control portion 360 and/or writing manager 371 (FIG. 11B) cause the processor to perform actions, such as operating controller 362 to image a passive e-paper display via erasing, reading, and writing actions, and to coordinate timing and sequencing of these actions in a workflow in a manner generally described in at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 370. In one example, memory 370 comprises a computer readable tangible medium providing non-volatile storage of the machine readable instructions executable by a process of controller 362. In other examples, hard wired circuitry may be used in place of or in combination with machine readable instructions (including software) to implement the functions described. For example, controller 362 may be embodied as part of at least one application-specific integrated circuit (ASIC). In at least some examples, the controller 362 is not limited to any specific combination of hardware circuitry and machine readable instructions (including software), nor limited to any particular source for the machine readable instructions executed by the controller 362. In some examples, user interface 366 comprises a user interface or other display that provides for the simultaneous display, activation, and/or operation of at least some of the various components, functions, features, and of control modules, control portions, and writing manager 371 as described in association with at least FIGS. 1A-11C. In some examples, at least some portions or aspects of the user interface 366 are provided via a graphical user interface (GUI).

Moreover, it will be understood that the features, functions, modules, and components of the writing systems, control portions, and writing manager 371 as described throughout the disclosure can be arranged in different forms and groupings, and therefore the writing systems, control portions, and writing manager 371 (FIG. 11B) are not strictly limited to the particular arrangement or groupings of functions, modules, and components illustrated in FIGS. 1A-11C.

Figure 11B:
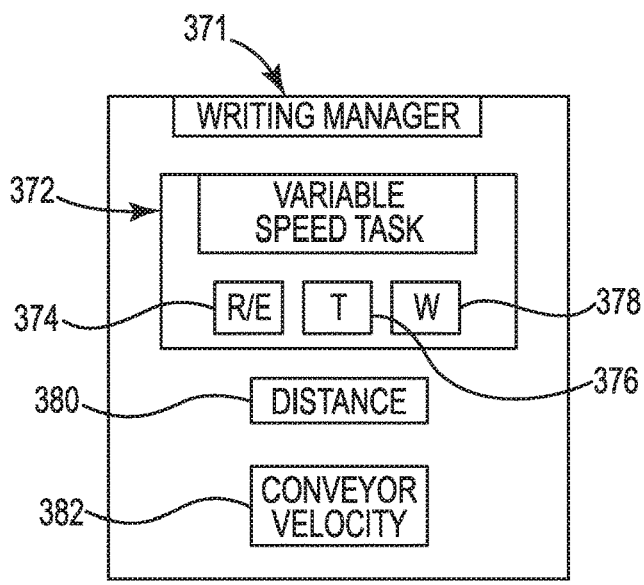
FIG. 11B is a block diagram schematically illustrating a writing manager, according to an example of the present disclosure.

FIG. 11B is a block diagram schematically illustrating a writing manager 371, according to one example of the present disclosure, storable in memory 370 as previously illustrated in association with FIG. 11A.

As further shown in FIG. 11B, in one example the writing manager 371 includes a variable speed task module 372, a distance function 380, and a conveyor velocity function 382. The variable speed task module 372 includes a read/erase (R/E) parameter 374 to control a speed of relative movement during reading a storage medium or erasing an e-paper display, a writing (W) parameter 378 to control a speed of relative movement during writing to an e-paper display, and a transit (T) parameter 376 to control a speed of relative movement between the writing action and the read/erase actions.

In one example, the distance function 380 accounts for, and or controls, a distance between a read/erase (R/E) portion and a writing (W) portion of a writing station. In one example, the conveyor velocity function 382 tracks, and/or controls, a speed and a direction of a conveyor (of a positioning mechanism) supporting either the media or a writing module. In some examples, the variable content module 390 is consistent with, and/or includes at least substantially the same features and attributes, as the action occurring in gathering variable content at 450 in the workflow 401 of FIG. 12.

Figure 11C:
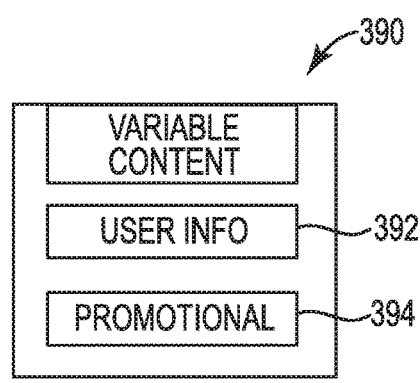
FIG. 11C is a block diagram schematically illustrating a variable content module, according to an example of the present disclosure.

FIG. 11C is block diagram schematically illustrating a variable content module 390, according to an example of the present disclosure. In general terms, the variable content module 390 tracks, obtains, and/or controls variable content for the passive e-paper display 92. In one example, the writing manager 371 stored in memory 370 includes, or is in communication with, the variable content module 390. In some examples, as shown in FIG. 11C, the variable content module 390 includes a user information function 392 to obtain and supply user-specific data and a promotion function 394 to obtain promotional content from external sources.

FIG. 12 is diagram 400 schematically illustrating a workflow 401 of a writing system, according to one example of the present disclosure. In one example, the workflow is performed using at least some of the components, functions, and systems previously described in association with at least FIGS. 1-11C. In general terms, the workflow 401 automatically manages multiple tasks that occur over time such that the various tasks are executed in the proper sequence (or in parallel), at the proper time, and while minimizing the total elapsed time of operation of the writing system on a media to maximize the convenience and experience of the consumer. Accordingly, after receiving a media from a user, the workflow 401 performed via the writing system is generally automated except for receiving user input regarding an identity of the user. However, even in that instance, the workflow 401 includes a prompt to the user to initiate the receiving of the user input.

In one example, the workflow 401 comprises a method of imaging a media and/or a method of performing a transaction.

As shown at 410 in FIG. 10, in one example the workflow 401 begins with the insertion of a media into a writing system. At 420, the workflow 401 includes erasing any image on the passive e-paper media display of the transaction media, and at generally the same time, at 422 reading the computer readable storage medium (e.g. magnetic strip or integrated circuit chip) of the transaction media.

At this point, the workflow 401 branches along two generally parallel paths. In a first path 425, the data (445) obtained from reading the storage medium on the media is fed into an action of gathering variable content at 450. In general terms, at 450 the workflow 401 gathers multiple pieces of information from various sources. Some combination of this information is consolidated and then used to generate an image, as shown at 460, for writing on the passive e-paper media display, as shown at 440 in FIG. 12.

In one aspect, the tasks performed along the first path 425 are not visible to the user and are performed "behind the scenes" by the writing system.

In a second path 427, the workflow 401 includes verifying an identity of the user as shown at 430 in FIG. 12. In at least some examples, this identity verification includes receiving a personal identification code, such as a personal identification number (PIN) via a keypad or other input mechanism (voice recognition, USB, etc.). Using this information an identity verification module 455 interfaces with a database or other resource to authenticate the identity of the user relative to the information obtained on the storage medium of the media and/or accessible via the database. If the identity is successfully verified at 455, the workflow continues with generation of an image at 460, as described in further detail below.

In some examples, either prior to, or as part of, generating an image at 460 in FIG. 12, the user-specific information (e.g. account information) is merged at or consolidated in some form with the obtained promotional content, as represented by block diagram of a merge content component 520 shown in FIG. 13.

In one aspect, gathering variable content (at 450) and generating an image (at 460) occurs during movement of the media from a first region at which from a first region at which the reading and erasing takes place (represented via 420, 422) to a second region at which the e-paper is imaged at 440. This movement is represented, at least in part, via the "physical process" 435 in FIG. 12. Moreover, in one example, in workflow 401 the gathering of variable content at 450 occurs during the same general time frame that the user inputs their PIN and that the identity verification function 455 operates, such that the user is generally not conscious of the lag time occurring between the reading/erasing at 420,422 and initiation of the imaging of the e-paper media display, as at 440. Moreover, in some examples, at least some portion of the time period during which the image is generated (at 460), the media and writing module experience further relative movement with respect to each other, as represented via the "physical process" at 435.

As shown in FIG. 12, workflow 401 occurs according to a time line 470 measured in units of time ("x"). In some examples, x represents a selectable unit of time (e.g. x=0.1 seconds, x=0.2 seconds, x=0.5 seconds, etc.) because the time line 470 does not necessitate that a particular task (e.g. operation of variable content module) take a fixed amount of time. Rather, in one example, the time line 470 represents that a cumulative amount of time to perform the various tasks along the first path 425 will take approximately the same cumulative amount of time to perform the various tasks along the second path 427, such that the user experiences a sense of convenience, participation, service during their transaction.

Moreover, in some examples, via a control portion 360 (FIG. 11A) an operator is able to adjust the time allotted for a given task on the respective first and second paths 425, 427 to adjust the workflow 401.

FIG. 13A is a diagram 500 schematically illustrating actions 502, 504 occurring as part of gathering variable content (at 450 in FIG. 12), according to one example of the present disclosure. As shown at 502 in FIG. 13A, gathering variable content includes retrieving user-related informational content which involves using the user-specific data 445 (from the storage medium on the media) to obtain pertinent financial information, such as account balance, most recent transaction, etc.) or personal/personnel information, such as security clearance, title, etc. As further shown at 504 in FIG. 13A, gathering variable content also includes obtaining other content, such as promotional content. In some examples, this promotional content includes advertisements for services/products, which may or may not originate from the vendor sponsoring the card. As further shown at 510 in FIG. 13B, in some examples gathering variable content includes performing a bid solicitation to receive bids from multiple vendors to place their advertisements on the e-paper media display of the card of the particular user.

In some examples, workflow 401 of FIG. 12 is applicable to operation of the station 330 (FIGS. 10A-10C). In this arrangement, control portion 339 of station 330 (FIG. 10A-10C) manages the time used to perform the actions of gathering variable content (at 450 in FIG. 12), of generating an image (at 460 in FIG. 12), and verifying an identity (at 455 in FIG. 12) relative to the movement, speed, direction, and position of tray 350 used to erase and write the e-paper display 92 of media 334 and to read integrated circuit chip 336 of media 334.

In some examples, workflow 401 of FIG. 12 is applied to operation of the writing system 301 (FIGS. 8A-8C). In this arrangement, a control portion manages the time used to perform the actions of gathering variable content (at 450 in FIG. 12), of generating an image (at 460 in FIG. 12), and verifying an identity (at 455 in FIG. 12) relative to the movement, speed, direction, and position of media 310 during erasure and writing of the e-paper display 92 of media 80, and to read the magnetic strip 90 of media 80.

Figure 14A:
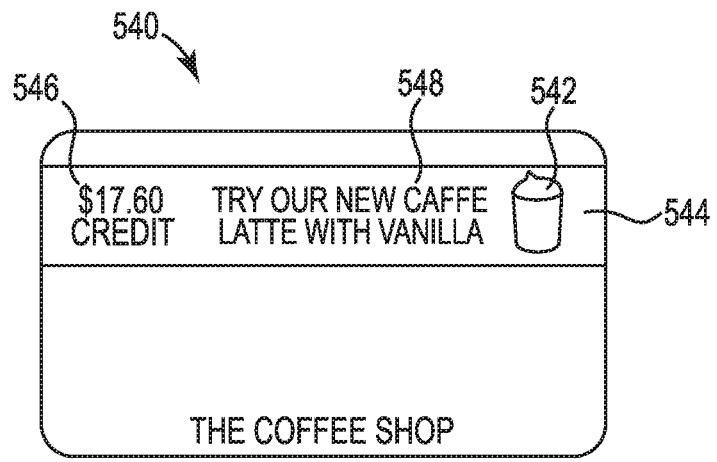
FIGS. 14A, 14B include a top plan view with each schematically illustrating a transaction media, according to examples of the present disclosure.
Figure 14B:
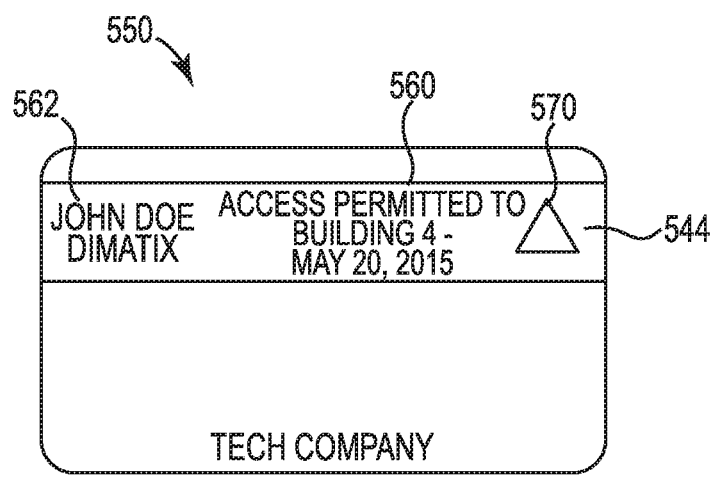

FIGS. 14A and 14B show two illustrative media 540, 550 which use a strip of e-paper 544 across the length of the respective media to display information, according to an example of the present disclosure. In one example, the e-paper 544 is used alone or in combination with a computer readable storage medium, such as a magnetic strip, integrated circuit chip, bar code, or embedded radio frequency circuitry. In one example, FIG. 14A illustrates a financial transaction media 540, such as a gift card used in a retail setting. The media 540 displays text 546 which communicates the dollar amount remaining on the media 540. Additional text 548 and an image 542 describing a featured product are also included on the media 540.

FIG. 14B is an information transaction media 550, such as a security access card, which grants the user access to specific buildings for a predetermined period of time. The user's name 562 and access permissions 560 are printed on e-paper 544. A security symbol 570 is printed in the right portion of the e-paper 544. The use of e-paper 554 allows the user and others to visually identify the information which is associated with the media 550. For example, in one implementation the security symbol 570 is changed every day to help prevent a security breach.

In some examples, the information visually displayed on the media is electronically communicated by alternative technology to computing devices. In one example, when making a purchase, the $17.60 which remains on the media 540 is read from a magnetic strip on the back of the media by a credit card reader. The appropriate deduction is made from the account and the new total and a new advertisement is written on the e-paper strip 544 on the front of the media 540.

Similarly, in one example, the security media 550 shown in FIG. 14B is read from radio transmission circuitry that is embedded within the card. However, if the e-paper 544 has been appropriately secured against alteration, the information contained on card 550 is readable directly from the e-paper 544 using optical or charge based reading techniques. For example, a security personnel would be able to visually inspect the e-paper on the card 552 to ascertain the credentials of the carrier. Similarly, a cashier is enabled to simply read the amount 546 contained on the media 540 by looking at it. In other examples, the e-paper 544 is optically or electronically scanned to retrieve the information in electronic format.

Figure 15:
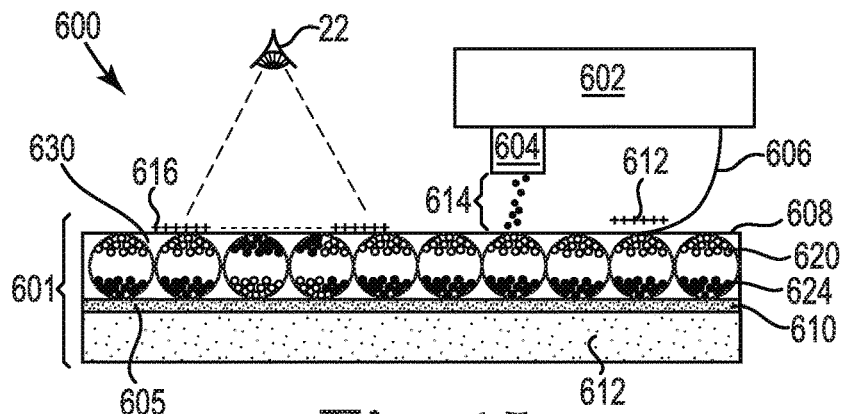
FIG. 15 is a side sectional view schematically illustrating a passive electronic paper display and associated writer, according to an example of the present disclosure.

FIG. 15 is a side view providing a more detailed schematic representation of an e-paper structure 601 and an associated e-paper writing system 600, according to one example of the present disclosure. In some examples, this e-paper structure 601 represents one general type of a passive e-paper display 92 used in media 80, as previously described in association with at least FIGS. 1-14B.

As shown in FIG. 15, the writing system 600 includes a writing module 602, writing unit 604, and an erasing unit 606. The writing unit 604 and erasing unit 606 are connected to the same side of the writing module 602 that faces the outer surface of the charge receiving surface 608 of the media, with the writing unit 604 suspended above the surface 608. In the example of FIG. 15, the writing unit 604 is an ion-based writing head. In some examples, the erasing unit 606 is an electrode that comes into close contact with, or that is dragged along, the surface 608 in front of the writing unit 604, as shown in FIG. 15. However, in some examples, the erasing unit 606 includes an ion-based erasing head which provides non-contact erasure. In some examples, the ion-based writing and/or erasing units include a corona-based charge mechanism. As previously described through the present disclosure, writing is performed upon relative movement between the writing module 602 and the media.

In the example shown in FIG. 15, the black particles 624 and the white particles 620 of the microcapsules 605 are positively charged and negatively charged, respectively. The erasing unit 606 erases any information stored in the microcapsules prior to writing information with the ion head 604. In the example shown in FIG. 3, as the e-paper 601 passes under the writing module 602, the positively charged erasing unit 606 removes negatively charged ions that are attached to the surface 608. The positively charge erasing unit 606 also creates electrostatic forces that drive positively charged black particles 624 away from the charge receiving layer 608 and attract negatively charged white particles 620 toward the charge receiving layer 608. By passing the erasing unit 606 over the charge receiving layer 608, the information written to the e-paper 601 is erased by positioning the negatively charged white particles 620 near the top of the microcapsules 605 and pushing the positively charged black particles 624 to the bottom of the microcapsules 605.

FIG. 15 also shows an illustrative writing operation performed by the ion head 604. The ion head 604 is designed and operated to selectively eject electrons 614, shown as black bars, toward the charge receiving surface 608, when a region of the e-paper 601 located beneath the ion head 604 is to be changed from white to black. As the electrons 614 reach the surface 608, the negatively charged white particles 620 are repelled and driven away from the charge receiving surface 608, while the positively charged black particles 624 are attracted to the negatively charged electrons/ions 614 and driven toward the charge receiving surface 608. For example, as the ion head 604 passes over microcapsule 605 while ejecting electrons, the negatively charged white particles 620 are repelled away from the insulating layer and the positively charged black particles 624 are driven toward the charge receiving surface 608.

The e-paper writing system 600 is not limited to implementations in which the ion head 604 discharges electrons and the erasing unit 606 erases information with positive charges. In some examples, the microcapsules 605 in the active layer are composed of negatively charged black particles and positively charged white particles. In some examples, the ion head 604 is designed to produce positively charged ions, which are absorbed by the surface 608 while the erasing unit 606 uses negative charges to erase information stored in the microcapsule layer of the e-paper 601.

Figure 16A:
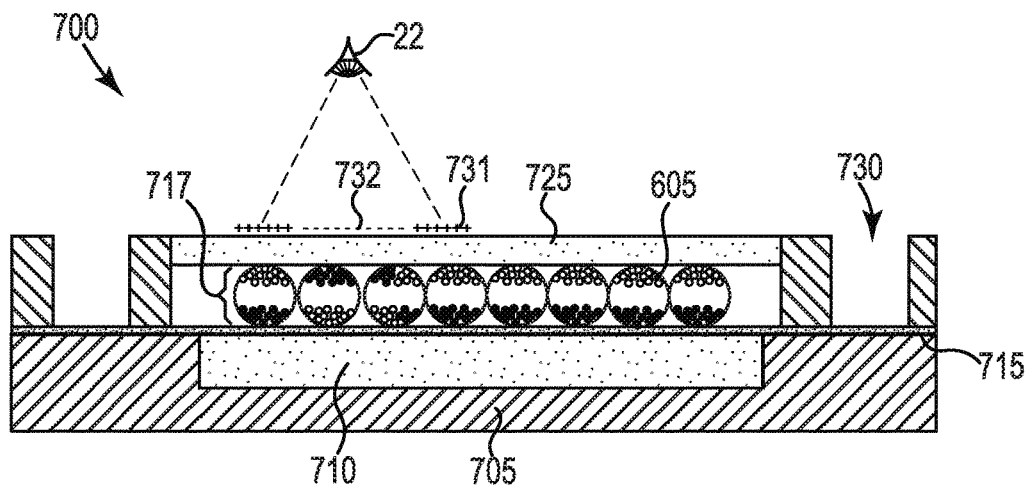
FIGS. 16A, 16B, 16C are side sectional views each schematically illustrating a passive electronic paper display of a media, according to an example of the present disclosure.
Figure 16B:
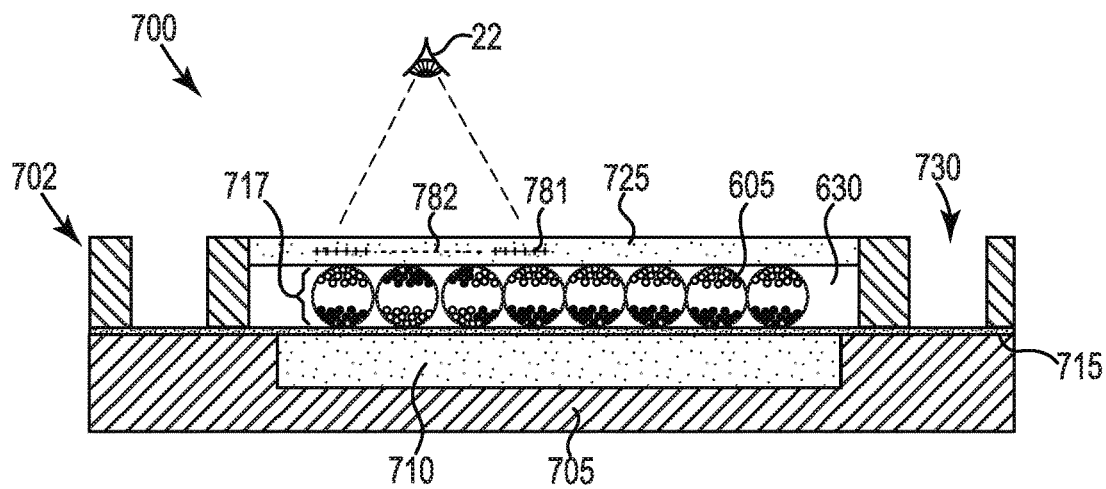

In some examples, in order to increase the robustness of e-paper, a protective coating 725 is applied to form the e-paper structure 601 shown in FIG. 16A. This coating is designed to protect the e-paper and microcapsules from mechanical damage, pressure and impact, and from collecting tribo charges. It also designed to reduce increases in dot size due to field screening during charging (the "blooming effect"). In one implementation, the charge receiving layer 725 has semiconducting characteristics which allow for a controlled decay of the latent charge image.

FIG. 16A is a cross section of an illustrative e-paper structure 700 which allows for controlled dissipation of charges, according to one example of the present disclosure. In some examples, this e-paper structure 700 represents one general type of a passive e-paper display 92 used in media 80, as previously described in association with at least FIGS. 1-14B.

FIG. 16A includes a base 705 that structurally supports other components, a protective layer 710, a ground plane 715, microcapsules 605 in an active layer 717, and a charge receiving layer 725. In one aspect, the base 705 is relatively thick, on the order of 500 µm or greater. Ground access windows 730 provide access to the ground plane through the base layer 705. During writing, electrical contact is made with the exposed portions of the ground plane 705 through the access windows 730. This allows biasing of the ion head while writing.

The protective layer 710 can be either transparent or opaque and has a thickness ranging from nanometers to millimeters. In one implementation, the protective layer 710 is formed from MYLAR film that has a thickness of approximately 100 microns. The active layer 717 contains the microcapsules 605 and has a thickness which is commensurate with the diameter of the microcapsules 605. In one example, the active layer 717 has a thickness of 100 microns. The charge receiving layer 725 in this example is a transparent semiconducting material with a thickness between 50-250 microns.

As discussed above, deposition of charges 731, 732 onto the charge receiving layer 725 influences the distribution of charged pigments in the microcapsules 605. Specifically, positive charges on the charge receiving layer 725 attract negatively charge pigments in the microcapsules 605. In this example, the white pigments have a negative charge and the black pigments have a positive charge. Where negative charges 732 have been deposited on the charge receiving layer 725, the black pigments are attracted to the surface. When viewed through the charge receiving layer 725, the negatively charged areas of the charge receiving layer 725 appear black and the positively charged areas appear white.

The charge receiving layer 725 in this example is formed from a semiconducting material which gradually dissipates the charges to the ground plane 715. The resistivity of the layer 725 is designed to enable fast movement of charges 732 and 731 through it as shown in FIG. 16B where charges 731 and 732 are moved to new locations 781 and 782 respectively. According to one example, the resistivity of the semiconducting charge receiving layer 725 is selected such that the discharge time constant is less than the few seconds after writing but before the media is ejected from the device and returned to the media holder. The charges will typically be transferred to the ground layer 715 through the layer 717. In particular, the matrix material 730 is selected to provide the desired optical and mechanical characteristics, as well as the desired electrical resistivity.

In one aspect, the semiconducting charge receiving layer 725 is also be designed to provide mechanical protection to the underlying layers while being hard enough to resist puncture from pointed objects.

Figure 16C:
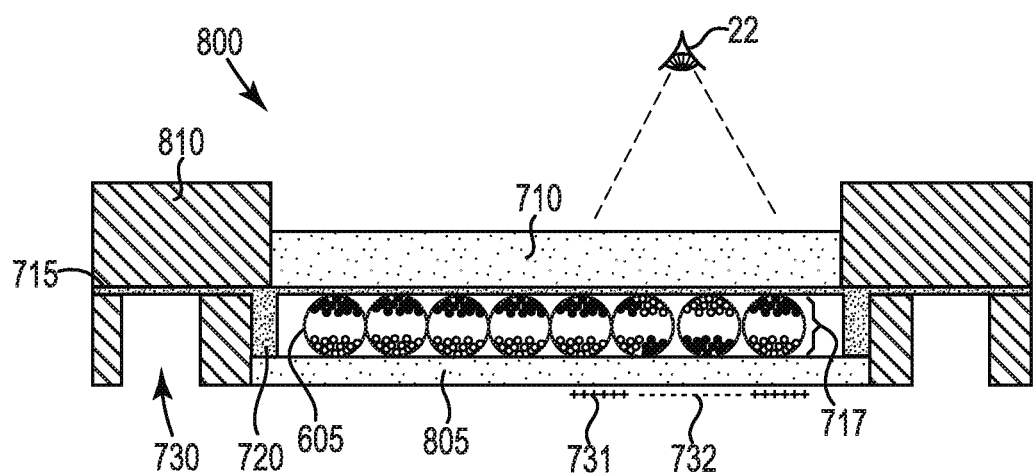

FIG. 16C is a cross sectional view of an e-paper structure 800 in which the imaging side and viewing side are on opposite surfaces of the e-paper 800, according to an example of the present disclosure. In some examples, this e-paper structure 800 represents one general type of a passive e-paper display 92 used in media 80, as previously described in association with at least FIGS. 1-14B. Moreover, the e-paper structure 800 is a particular example of the type of e-paper deployed in the previously described examples associated with at least FIGS. 4B, 5, 6A-6B, 7, 8A-8C, 9, and 10A-10C.

The e-paper 800 includes a substrate 810, a ground plane 715, a semiconducting charge receiving layer 805, and an active layer 717 which contains microcapsules 605. The substrate 810 contains windows 730 which provide access to the ground plane 715. The substrate 810 also contains a window 815 through which a protective layer 710 can be viewed. In one aspect, charges 731 and 732 from the top of layer 805 are discharged to the ground plane 715 via layers 717 and 805. In some implementations, an additional ground connection 720 is added. The protective layer 710 and ground plane 715 have optical characteristics which allow the pigments in the microcapsules 605 to be viewed from the side opposite the imaging side. In one aspect, the protective layer 710 is formable from a variety of materials, including glass and clear polymers such as MYLAR film.

In this implementation, in some examples the semiconducting layer 805 is opaque. Thus a wider range of semiconducting materials and compositions are usable to form the semiconducting layer 805, and the semiconducting layer 805 may be thicker to provide additional structural support.

Figure 17:
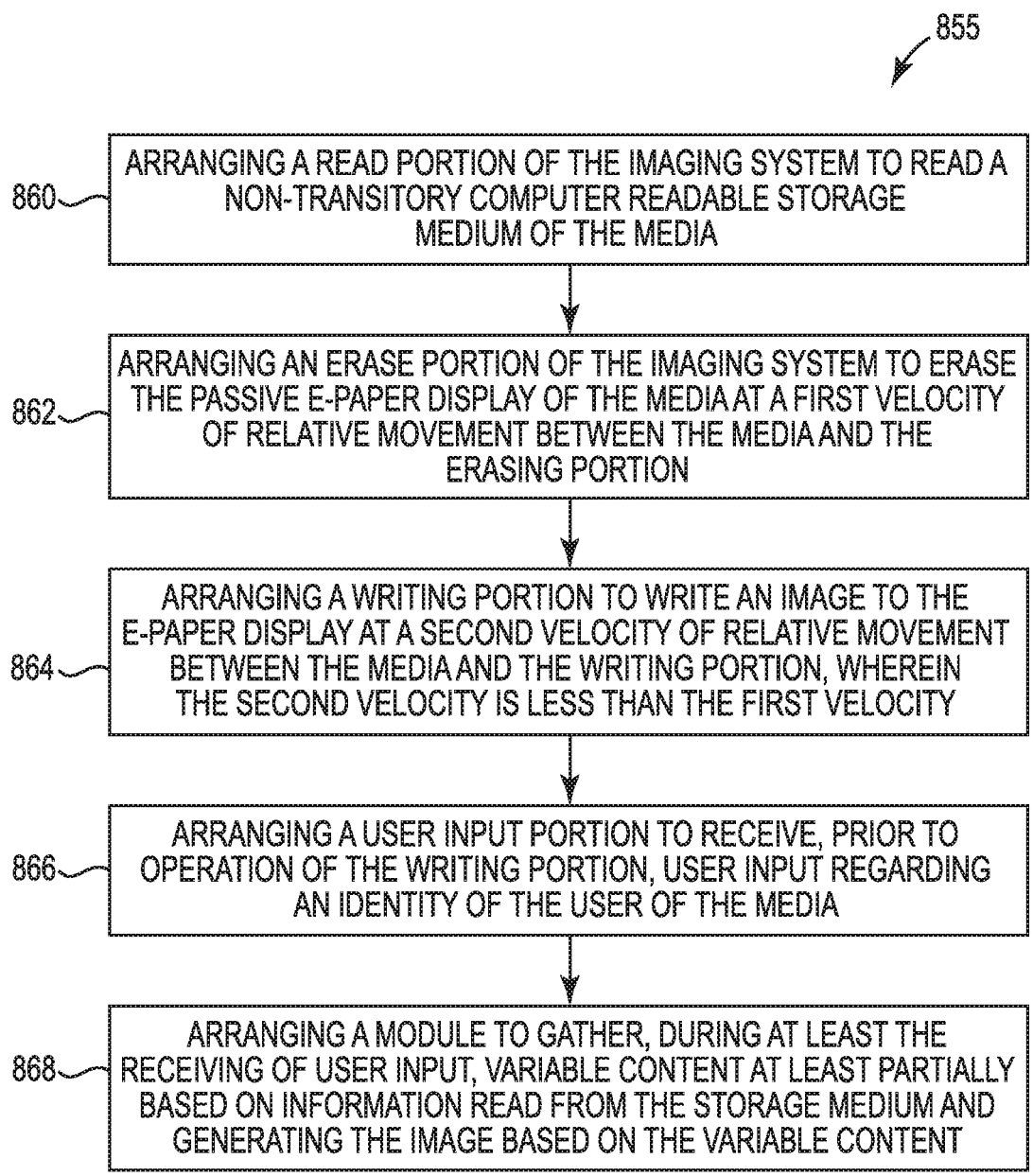
FIG. 17 is flow diagram schematically illustrating a method of manufacturing an imaging system, according to an example of the present disclosure.

FIG. 17 is a flow diagram 850 schematically illustrating a method 855 of manufacturing an imaging system to image a passive e-paper display of a transaction media according to an automated workflow, according to one example of the present disclosure. In some examples, method 855 is performed by employing at least some of the components, functions, modules, and systems previously described and illustrated in association with FIGS. 1-16C. In some examples, method 855 is performed by employing at least some components, functions, modules, and systems other than those previously described and illustrated in association with FIGS. 1-16C.

As shown in FIG. 17, at 860 method 855 includes providing a read portion of the imaging system to read a non-transitory computer readable storage medium of the media and, at 862, arranging an erase portion of the imaging system to erase the passive e-paper display of the media at a first velocity of relative movement between the media and the erasing portion. In some examples, arranging the erase portion includes causing performance of the erasing at generally the same time as the reading. At 864, method 855 includes arranging a writing portion to write an image to the e-paper display at a second velocity of relative movement between the media and the writing portion, wherein the second velocity is less than the first velocity. At 866, a user input portion is arranged to receive, prior to operation of the writing portion, user input regarding an identity of the user of the media. At 868, method 855 includes arranging a module to gather, during at least the receiving of user input, variable content at least partially based on information read from the storage medium and arranging the module to generate the image based on the variable content.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device to write on a media card, the media card including a passive e-paper display portion and a non-e-paper portion, which comprises a computer readable storage medium, wherein the device comprises:
    a read/write portion including:
        a first component including a computer readable computer storage medium reader to at least read the computer readable storage medium on the non-e-paper-portion of the media card;
        a second component including a first ion head to write, via non-contact application of airborne charges, to the passive e-paper display portion of the media card during relative movement at a first velocity between the second component and the media card, the second component to perform the writing after the first component is to perform the reading; and
        a third component including a second ion head to erase, via non-contact application of airborne charges, the passive e-paper display portion, before operation of the second component, during relative movement at a second velocity between the third component and the media card,
        wherein the second velocity differs from the first velocity by at least one of speed and direction.

2. The device of claim 1, comprising a housing in which the first component is located, wherein the computer readable storage medium reader comprises an integrated circuit chip reader to read an integrated circuit chip of the computer readable storage medium of the media card, wherein the first component is generally stationary, and wherein housing comprises a slot in which the media card is at least partially insertable to position the integrated circuit chip of computer readable storage medium of the media card to be co-located with, and in operative communication with, the first component.

3. The device of claim 2, wherein the housing comprises a tray moveable relative to an exterior of the housing and on which the second component and the third component are both located to cause the movement of the second component and the third component relative to the passive e-paper display portion of the media card while the integrated circuit chip of the computer readable storage medium of the media card remains generally co-located with the first component.

4. The device of claim 3, wherein the third component operates during movement of the tray in a first direction outwardly away from the exterior of the housing and wherein the second component is to operate during movement of the tray in a second direction inwardly towards the exterior of the housing, and
    wherein the slot of the housing is to removably receive the media card in a position in which an imaging side of the passive e-paper display portion of the media card faces toward the movable tray and in which an opposite viewing side of the media card faces away from the tray and is to be visible during movement of the tray to allow viewing of the imaging of the passive e-paper display portion of the media card.

5. The device of claim 1, wherein the second component is spaced longitudinally apart along a workflow path by a first distance from the first component with the second component following the first component in the workflow path to operate after the first component, and wherein the first distance between the first component and the second component is selected to cause both reading on the computer readable storage medium of the media card and erasing of the entire passive e-paper display portion of the media card to be completed before the writing on the passive e-paper display portion of the media cared is commenced via the first ion head of the second component.

6. The device of claim 5, wherein the computer readable storage medium reader of the first component comprises a magnetic read head to read a magnetic strip of the computer readable storage medium of the media card, and wherein the first component is generally located adjacent the third component.

7. The device of claim 5,
wherein the computer readable storage medium reader of the first component comprises a bar code reader to read a bar code of the computer readable storage medium of the media card, and the third component is generally co-located with the first component.

8. The device of claim 1, comprising:
a variable content module to retrieve variable content after the reading via the first component but prior to the writing via the second component, wherein the variable content includes at least one of user-related transaction information and promotional information, and wherein the variable content is at least partially based on information read from the computer readable storage medium of the media card via the first component; and
an image generation module to generate an image based on the variable data, wherein the image is writable by the second component onto the passive e-paper display portion of the media card.

9. The device of claim 8, comprising:
an identification verification module to receive user identification information, to verify a user identity, and to operate between a first time of operation of the first component and a later second time of operation of the second component.

10. The device of claim 1, wherein the second component is spaced longitudinally apart along a workflow path by a first distance from the first component with the second component located after the first component in the workflow path to operate after the first component, and wherein the first distance is at least equal to or greater than a length of the passive e-paper display portion of the media card.

11. The device of claim 10, wherein the first component is separate from, and independent of, the third component.

12. The device of claim 1, wherein a second speed of the second velocity is substantially greater than a first speed of the first velocity.

13. The device of claim 5, wherein the first component is separate from, and independent of, the third component.

14. The device of claim 1, wherein the third component is to erase the passive e-paper display portion of the media card via non-contact application of airborne charges.

15. A writing station to write on a transaction media card, the transaction media card including a passive e-paper display portion and a non-e-paper portion, which includes a computer readable storage medium, wherein the writing station comprises:
a read/write portion including:
a first component comprising a computer readable storage medium reader to at least read the computer readable storage medium of the transaction media card; and
a second component comprising a first ion head to at least write, via non-contact application of airborne charges, to the passive e-paper display portion of the media card;

a positioning mechanism to control relative movement between the read/write portion and the transaction media card, including causing the movement to:
occur at a first velocity when operating the first component to read the computer readable storage medium of the non-e-paper portion of the transaction media card; and
occur at a second velocity, different than the first velocity, when operating the second component to write to the passive e-paper display portion; and
a control portion including a variable content function to obtain variable content at least during relative movement of the transaction media card via the positioning mechanism and an image generation function to generate an image for writing, via the second component, to the passive e-paper display portion of the transaction media card based on the obtained variable content.

16. The writing station of claim 15, wherein the control portion includes an identity verification function to verify an identity of a user after the reading and at least during operation of the variable content function.

17. The writing station of claim 15, wherein the read/write portion includes a third component to erase the passive e-paper display portion of the transaction media card and co-located with the first component, wherein the first velocity of relative movement between the transaction media and the co-located first and third components includes a first speed and a first direction generally the same as a second direction of the second velocity, the first speed being substantially faster than a second speed of the second velocity, and wherein the second component is longitudinally spaced apart from the co-located first and third components and the second component follows the co-located first and third components in a workflow path.

18. The writing station of claim 15, wherein the read/write portion includes a third component including a second ion head to erase the passive e-paper display portion of the transaction media card with the third component co-located with the second component, wherein the third component is to operate prior to operation of the second component, and the first component is to operate prior to operation of the second component, and wherein the velocity of relative movement between the transaction media card and the respective first, second, and third components includes:
the first velocity including a first speed equal to zero and a first direction that is neutral;
a third velocity including a third speed and a third direction during erasing the passive e-paper display portion via the third component; and
the second velocity including a second direction opposite the third direction and a second speed substantially slower than the third speed.

19. A method of manufacturing an imaging system to image a passive e-paper display portion of a transaction media card according to an automated workflow, the method comprising:
arranging a computer readable storage medium reader of the imaging system to read a computer readable storage medium on a non-e-paper portion of the transaction media card;
arranging an ion-head-based erase portion of the imaging system to erase the passive e-paper display portion of the transaction media card at a first velocity of relative movement between the transaction media card and the erasing portion, and to perform the erasing at generally the same time as the reading;

arranging an ion-head-based writing portion to write, via non-contact application of airborne-charges, an image to the passive e-paper display portion at a second velocity of relative movement between the transaction media card and the writing portion, wherein the second velocity is less than the first velocity and wherein the writing portion is operate after operation of the read portion;

arranging a user input portion to receive, prior to operation of the writing portion, user input regarding an identity of the user of the transaction media card; and arranging a module to gather, during at least the receiving of user input, variable content at least partially based on information read from the computer readable storage medium of the transaction media card and to generate the image based on the variable content.

20. The method of claim 19, comprising:

arranging the writing station to cause an imaging side of the passive e-paper display portion of the transaction media card to face toward at least a portion of a writing station that performs the reading, erasing, and writing; and arranging the writing station to cause an opposite viewing side of the passive e-paper portion display of the transaction media card to face away from the at least a portion of the writing station during at least the erasing and the writing.

* * * * *